(12) United States Patent
Richmond et al.

(10) Patent No.: US 11,475,548 B2
(45) Date of Patent: Oct. 18, 2022

(54) SYSTEMS AND METHODS FOR EMULATING FAR-RANGE LIGHTING FOR AN OPERATIONAL SCENE ILLUMINATED BY CLOSE-RANGE LIGHT

(71) Applicant: Intuitive Surgical Operations, Inc., Sunnyvale, CA (US)

(72) Inventors: Geoffrey A. Richmond, San Jose, CA (US); Brian D. Hoffman, Mountain View, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 0 days.

(21) Appl. No.: 17/294,528

(22) PCT Filed: Nov. 18, 2019

(86) PCT No.: PCT/US2019/062032
§ 371 (c)(1),
(2) Date: May 17, 2021

(87) PCT Pub. No.: WO2020/106629
PCT Pub. Date: May 28, 2020

(65) Prior Publication Data
US 2021/0407053 A1    Dec. 30, 2021

Related U.S. Application Data

(60) Provisional application No. 62/769,481, filed on Nov. 19, 2018.

(51) Int. Cl.
*G06T 5/00*    (2006.01)
*G06T 7/55*    (2017.01)
(52) U.S. Cl.
CPC .............. *G06T 5/009* (2013.01); *G06T 7/55* (2017.01)

(58) Field of Classification Search
CPC ...................................................... G06T 5/009
See application file for complete search history.

(56) References Cited

U.S. PATENT DOCUMENTS

| | | | | |
|---|---|---|---|---|
| 2010/0134607 A1* | 6/2010 | Ishihara | .................. | A61B 8/12 348/E7.085 |
| 2011/0026051 A1* | 2/2011 | Wang | ..................... | G06T 5/008 358/1.9 |
| 2015/0002720 A1* | 1/2015 | Mankowski | ............ | G06F 3/042 348/333.02 |

FOREIGN PATENT DOCUMENTS

JP    2014161355 A    9/2014

OTHER PUBLICATIONS

International Preliminary Report on Patentability for Application No. PCT/US2019/062032, dated Jun. 3, 2021, 07 pages.

(Continued)

*Primary Examiner* — Shivang I Patel

(57) ABSTRACT

A lighting emulation system accesses an image that is captured by an imaging device and that depicts an operational scene illuminated by close-range light. The lighting emulation system accesses a depth map of the operational scene that includes depth data corresponding to each pixel in the image. Based on the depth map, the lighting emulation system determines a far-range lighting coefficient for each pixel in the image. Specifically, the far-range lighting coefficient for each respective pixel is determined based on the corresponding depth data included in the depth map for that respective pixel. Based on the image and the far-range lighting coefficient for each pixel in the image, the lighting emulation system generates a processed image depicting the operational scene as illuminated by far-range lighting, and provides the processed image for presentation on a display screen.

20 Claims, 12 Drawing Sheets

(56) References Cited

OTHER PUBLICATIONS

International Search Report and Written Opinion for Application No. PCT/US2019/062032, dated Jan. 31, 2020, 9 pages.
Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

* cited by examiner

SYSTEMS AND METHODS FOR EMULATING FAR-RANGE LIGHTING FOR AN OPERATIONAL SCENE ILLUMINATED BY CLOSE-RANGE LIGHT

RELATED APPLICATIONS

The present application is a U.S. National Stage Application under 35 U.S.C. § 371 of International Application No. PCT/US2019/062032, filed on Nov. 18, 2019, which claims priority to U.S. Provisional Patent Application No. 62/769,481, filed on Nov. 19, 2018, the contents of which are hereby incorporated by reference in their entirety.

BACKGROUND INFORMATION

During a computer-assisted surgical procedure, such as a minimally invasive surgical procedure that uses a computer-assisted surgical system, an imaging device such as an endoscope or other similar instrument may be used to capture imagery of an operational scene within an operational area (e.g., an area in which an operation such as a surgical procedure, an imaging operation, or another type of operation is being performed). The computer-assisted surgical system may display the captured imagery to medical personnel (e.g., to a surgeon and/or other members of a surgical team) to provide a visualization of the operational area that may assist the medical personnel in performing an operation at the operational area. However, there remains room to improve imagery of operational areas and the technologies used to provide such imagery.

SUMMARY

Systems and methods for emulating far-range lighting for an operational scene illuminated by close-range light are described herein. For instance, one embodiment is implemented as a system comprising a processor and a memory communicatively coupled with the processor and storing instructions that are executable by the processor. The instructions, when executed by the processor, may direct the processor to access an image that is captured by an imaging device and that depicts an operational scene illuminated by close-range light, as well as to access a depth map of the operational scene. The depth map may include depth data corresponding to each pixel in the image, and the instructions, when executed, may further direct the processor to determine a far-range lighting coefficient for each pixel in the image based on the depth map. For example, the far-range lighting coefficient for each respective pixel may be determined based on the corresponding depth data included in the depth map for that respective pixel. Based on the image and the far-range lighting coefficient for each pixel in the image, the processor may further be directed to generate a processed image depicting the operational scene as being illuminated by far-range lighting, and to provide the processed image for presentation on a display screen.

Another exemplary embodiment is implemented as a system comprising various elements. For instance, the system may comprise an imaging device configured to capture an image depicting an operational scene as illuminated by close-range light, a physical light source associated with the imaging device and configured to generate the close-range light to illuminate the operational scene, a display screen configured to present images captured by the imaging device, a processor communicatively coupled to the imaging device, and a memory communicatively coupled to the processor and storing instructions executable by the processor. In this embodiment, the instructions, when executed, may be configured to direct the processor to direct the imaging device to capture the image depicting the operational scene as illuminated by the close-range light, as well as to generate, based on the image depicting the operational scene, a depth map of the operational scene. The depth map may include depth data corresponding to each pixel in the image, and the instructions, when executed, may further direct the processor to determine a far-range lighting coefficient for each pixel in the image based on the depth map. For example, the far-range lighting coefficient for each respective pixel may be determined based on the corresponding depth data included in the depth map for that respective pixel. Based on the image and the far-range lighting coefficient for each pixel in the image, the processor may further be directed to generate a processed image depicting the operational scene as being illuminated by far-range lighting, and to provide the processed image for presentation on the display screen.

Yet another exemplary embodiment is implemented as a method performed by a lighting emulation system. For example, the method includes accessing an image that is captured by an imaging device and that depicts an operational scene illuminated by close-range light, as well as accessing a depth map of the operational scene, the depth map including depth data corresponding to each pixel in the image. The method further includes determining, based on the depth map, a far-range lighting coefficient for each pixel in the image, wherein the determining of the far-range lighting coefficient for each respective pixel is performed based on the corresponding depth data included in the depth map for that respective pixel. The method also includes generating, based on the image and the far-range lighting coefficient for each pixel in the image, a processed image depicting the operational scene as being illuminated by far-range lighting, as well as providing the processed image for presentation on a display screen.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
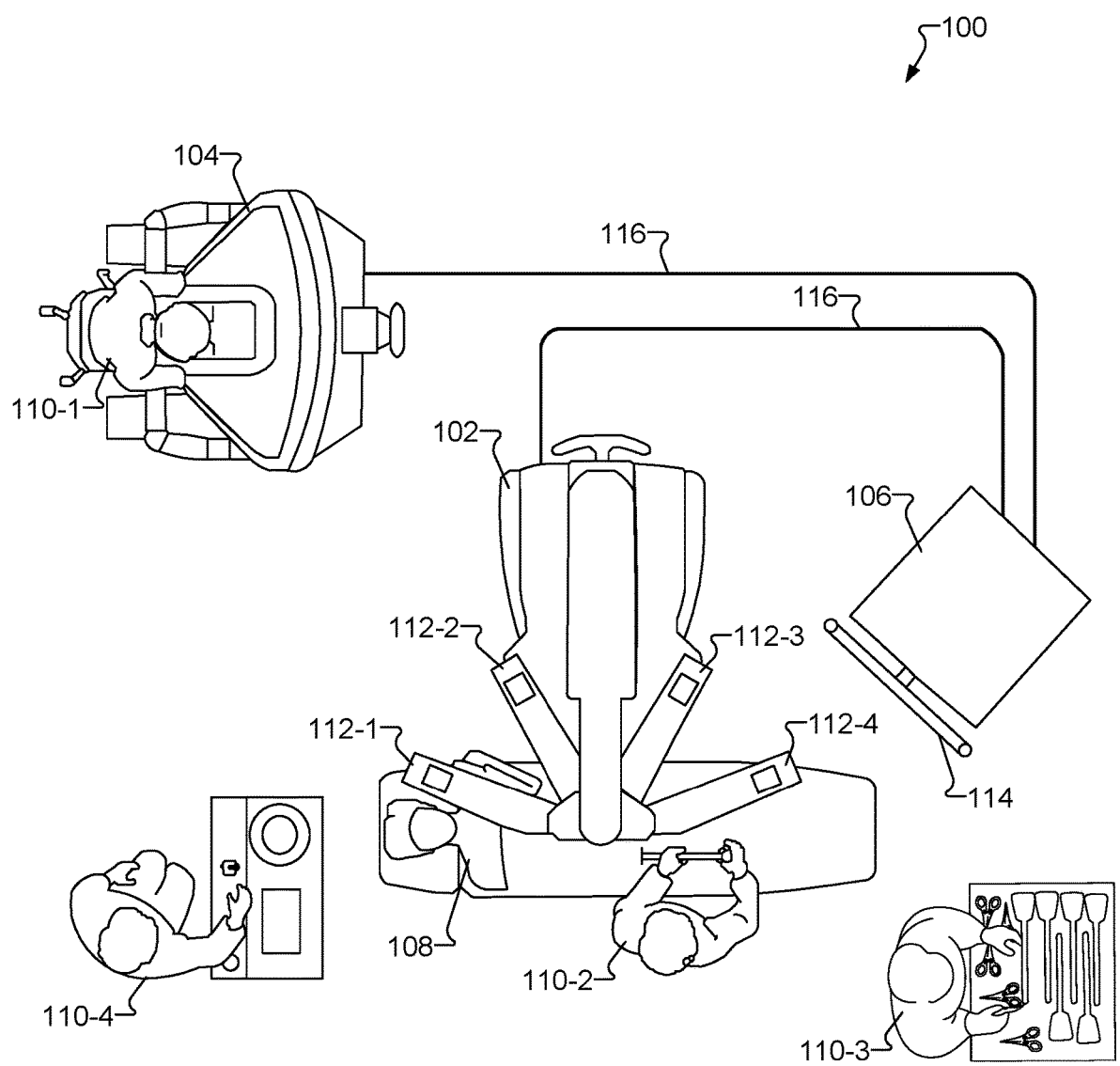
FIG. 1 illustrates an exemplary computer-assisted surgical system according to principles described herein.

Systems and methods for emulating far-range lighting for an operational scene illuminated by close-range light are described herein. Exemplary lighting emulation systems and methods described herein may be implemented by a computer-assisted surgical system and may improve brightness uniformity in images captured by imaging devices that capture images from a close range using close-range light. For example, as will be described in more detail below, an imaging device such as an endoscope or similar instrument may capture an image of an operational scene (e.g., a surgical scene including internal anatomy of a patient) that is illuminated by light originating from the imaging device itself or another light source near the operational scene (e.g., within a few centimeters of the operational scene). Due to the inverse square law of light (described below), the brightness of such images may tend to be non-uniform in brightness, leading to various issues when the images are presented. Accordingly, systems and methods described herein improve the brightness uniformity of such images based on depth data associated with the operational scene, and in such a way that the resulting images appear natural, consistent, and/or attractive. In some implementations, for instance, images of an operational scene illuminated by close-range light may be processed so as to give an appearance that the operational scene was instead illuminated by far-range light originating from a virtual light source relatively far away from the operational scene (e.g., at a location emulating a location of a light source that would be used in an open surgery).

To this end, in certain examples, an exemplary lighting emulation system may include or be implemented by a processor and a memory that is communicatively coupled with the processor and that stores instructions that are executable by the processor to direct the processor to perform various operations associated with emulating the far-range lighting for the operational scene illuminated by the close-range light. Such operations may include, for instance, any of the operations that will now be described.

The lighting emulation system may access an image depicting an operational scene illuminated by close-range light. The image may be captured by an imaging device (e.g., by way of an image sensor included within the imaging device). The imaging device may be located at an operational area that includes the operational scene. In an exemplary scenario involving a computer assisted surgery such as a minimally invasive surgery, the operational area may be an internal space of the patient, the operational scene may include particular anatomy within the operational area that is being imaged and/or operated on, the imaging device may be an endoscope or similar instrument (e.g., a laparoscope, a hyperspectral imaging device, etc.), and the image sensor may be a sensor associated with the imaging device and configured to capture images depicting the operational scene.

The lighting emulation system may further access a depth map of the operational scene. The depth map may include depth data corresponding to each pixel in the image. As will be described in more detail below, the depth map may be accessed in various ways such as by being received from another device or system, or by being generated by the lighting emulation system based on an image or images captured or accessed by the lighting emulation system itself. Based on the depth map, the lighting emulation system may determine a far-range lighting coefficient for each pixel in the image. For example, the far-range lighting coefficient for each respective pixel may be determined based on the corresponding depth data included in the depth map for that respective pixel. Based on the image and the far-range lighting coefficient for each pixel in the image, the lighting emulation system may generate a processed image depicting the operational scene as being illuminated by far-range lighting. The lighting emulation system may provide this processed image for presentation on a display screen.

Various benefits may be provided by the lighting emulation systems and methods described herein. For example, as mentioned above, brightness uniformity may be improved for captured images with highly non-uniform brightness or a wide dynamic range of brightness. By increasing the brightness uniformity and/or reducing the dynamic range of brightness in the ways described herein, lighting emulation systems and methods may provide images that, when presented on standard display screens (e.g., LCD monitors, etc.), look more natural and attractive, show more information, show information that is more readily understandable, and so forth compared to images not processed in accordance with systems and methods described herein. Images captured by endoscopic imaging devices such as those described herein may be particularly prone to having low brightness uniformity and wide dynamic range, thus commonly leading to and/or exacerbating various issues described herein. As will be described in more detail below, this is partly due to an inverse square law that defines the brightness of light as a function of distance from a light source. As such, many images captured using endoscopic imaging devices are likely to benefit significantly from the methods described herein of increasing brightness uniformity and reducing dynamic range.

Another advantage that may be provided by the systems and methods described herein relates to the manner in which brightness uniformity is increased. Rather than decreasing the brightness of initially bright pixels and/or increasing the brightness of initially dim pixels based only on raw brightness levels of the pixels, as performed by conventional systems for increasing brightness uniformity, methods and systems described herein adjust the brightness of each pixel of an image in accordance with a far-range lighting coefficient that is determined based on depth data corresponding to each pixel. This provides a final processed image that looks more natural (e.g., more genuine and realistic, less artificial or processed, etc.) than images that are altered without taking depth into account. By utilizing depth data as described herein, systems and methods described herein may emulate, within an image of an operational scene, far-range lighting such as would be present in an open surgery or other such scenario in which light originates from a location far enough away from the operational scene that the inverse square law of light does not have a significant or noticeable effect.

Along with an increase in uniformity of brightness, systems and methods of adjusting brightness that account for depth, such as the lighting emulation systems and methods described herein, may also beneficially provide an increase in brightness consistency. For example, rather than an entire image becoming relatively bright and then going relatively dim as the imaging device moves over dimmer and brighter sections of an operational scene, as may occur with using conventional autoexposure algorithms, the brightness of processed images provided by the systems and methods described herein may remain consistently as bright as a user might want them to be. For example, the brightness may consistently be as bright as simulated far-range light associated with open surgery lighting at a particular distance from the operational scene, or as bright as a user may select (e.g., in accordance with the user's preferences).

By emulating far-range lighting for an operational scene illuminated by close-range light to provide any of these or other benefits of improving brightness uniformity, systems and methods described herein may facilitate surgeons and other medical personnel in performing their work accurately, efficiently, and effectively. In this way, the medical personnel may enjoy an improved experience with fewer distractions during operations they perform. In turn, these improved experiences of the people performing the operations may lead to more effective and efficient operations and improved patient outcomes.

Various embodiments will now be described in more detail with reference to the figures. The systems and methods described herein may provide one or more of the benefits mentioned above and/or various additional and/or alternative benefits that will be made apparent herein.

Lighting emulation systems and methods described herein may operate as part of or in conjunction with a computer-assisted surgical system. As such, in order to promote an understanding of lighting emulation systems and methods described herein, an exemplary computer-assisted surgical system will now be described. The described exemplary computer-assisted surgical system is illustrative and not limiting. Lighting emulation systems and methods described herein may operate as part of or in conjunction with the computer-assisted surgical system described herein and/or with other suitable computer-assisted surgical systems.

FIG. 1 illustrates an exemplary computer-assisted surgical system 100 ("surgical system 100"). As shown, surgical system 100 may include a manipulating system 102, a user control system 104, and an auxiliary system 106 communicatively coupled one to another. Surgical system 100 may be utilized by a surgical team to perform a computer-assisted surgical procedure on a patient 108. As shown, the surgical team may include a surgeon 110-1, an assistant 110-2, a nurse 110-3, and an anesthesiologist 110-4, all of whom may be collectively referred to as "surgical team members 110." Additional or alternative surgical team members may be present during a surgical session as may serve a particular implementation.

While FIG. 1 illustrates an ongoing minimally invasive surgical procedure, it will be understood that surgical system 100 may similarly be used to perform open surgical procedures or other types of surgical procedures that may similarly benefit from the accuracy and convenience of surgical system 100. Additionally, it will be understood that the surgical session throughout which surgical system 100 may be employed may not only include an operative phase of a surgical procedure, as is illustrated in FIG. 1, but may also include preoperative, postoperative, and/or other such phases of the surgical procedure. A surgical procedure may include any procedure or operation in which manual and/or instrumental techniques are used on a patient to investigate or treat a physical condition of the patient.

As shown in FIG. 1, manipulating system 102 may include a plurality of manipulator arms 112 (e.g., manipulator arms 112-1 through 112-4) to which a plurality of surgical instruments may be coupled. Each surgical instrument may be implemented by any suitable surgical tool (e.g., a tool having tissue-interaction functions), medical tool, monitoring instrument (e.g., an imaging device such as an endoscope), sensing instrument (e.g., a force-sensing surgical instrument), diagnostic instrument, or the like that may be used for a computer-assisted surgical procedure on patient 108 (e.g., by being at least partially inserted into patient 108 and manipulated to perform a computer-assisted surgical procedure on patient 108). While manipulating system 102 is depicted and described herein as including four manipulator arms 112, it will be recognized that manipulating system 102 may include only a single manipulator arm 112 or any other number of manipulator arms as may serve a particular implementation.

Manipulator arms 112 and/or surgical instruments attached to manipulator arms 112 may include one or more displacement transducers, orientational sensors, and/or positional sensors used to generate raw (i.e., uncorrected) kinematics information. One or more components of surgical system 100 may be configured to use the kinematics information to track (e.g., determine positions of) and/or control the surgical instruments.

Surgical instruments attached to manipulator arms 112 may each be positioned at an operational area associated with a patient. As used herein, an "operational area" or a "surgical area" associated with a patient may, in certain examples, be entirely disposed within the patient and may include an area within the patient near where an operation (e.g., a surgical procedure) is planned to be performed, is being performed, or has been performed. For example, for a minimally invasive surgical procedure being performed on tissue internal to a patient, the operational area may include the tissue, anatomy underlying the tissue, as well as space around the tissue where, for example, surgical instruments being used to perform the operation are located. In other examples, an operational area may be at least partially disposed external to the patient. For instance, surgical system 100 may be used to perform an open surgical procedure such that part of the operational area (e.g., tissue being operated on) is internal to the patient while another part of the operational area (e.g., a space around the tissue where one or more surgical instruments may be disposed) is external to the patient. A surgical instrument may be referred to as being located at or within an operational area when at least a portion of the surgical instrument (e.g., a distal end of the surgical instrument) is located within the operational area.

User control system 104 may be configured to facilitate control by surgeon 110-1 of manipulator arms 112 and surgical instruments attached to manipulator arms 112. For example, surgeon 110-1 may interact with user control system 104 to remotely move or manipulate manipulator arms 112 and the surgical instruments. To this end, user control system 104 may provide surgeon 110-1 with imagery (e.g., high-definition 3D imagery) of an operational area associated with patient 108 as captured by an imaging device. In certain examples, user control system 104 may include a stereo viewer having two displays where stereoscopic images of an operational scene included within an operational area associated with patient 108 and generated by a stereoscopic imaging device may be viewed by surgeon 110-1. Surgeon 110-1 may utilize the imagery to perform one or more procedures with one or more surgical instruments attached to manipulator arms 112.

To facilitate control of surgical instruments, user control system 104 may include a set of master controls. These master controls may be manipulated by surgeon 110-1 to control movement of surgical instruments (e.g., by utilizing robotic and/or teleoperation technology). The master controls may be configured to detect a wide variety of hand, wrist, and finger movements by surgeon 110-1. In this manner, surgeon 110-1 may intuitively perform a procedure using one or more surgical instruments.

Auxiliary system 106 may include one or more computing devices configured to perform primary processing operations of surgical system 100. In such configurations, the one or more computing devices included in auxiliary system 106 may control and/or coordinate operations performed by various other components (e.g., manipulating system 102 and user control system 104) of surgical system 100. For example, a computing device included in user control system 104 may transmit instructions to manipulating system 102 by way of the one or more computing devices included in auxiliary system 106. As another example, auxiliary system 106 may receive, from manipulating system 102, image data representative of imagery captured by an imaging device attached to one of manipulator arms 112, and may process the image data in any of the ways described herein.

In some examples, auxiliary system 106 may be configured to present visual content to surgical team members 110 who may not have access to the images provided to surgeon 110-1 at user control system 104. To this end, auxiliary system 106 may include a display monitor 114 configured to display one or more user interfaces, such as images (e.g., 2D images) of the operational area, information associated with patient 108 and/or the surgical procedure, and/or any other visual content as may serve a particular implementation. For example, display monitor 114 may display images of an operational scene included within the operational area together with additional content (e.g., graphical content, contextual information, etc.) concurrently displayed with the images. In some embodiments, display monitor 114 is implemented by a touchscreen display with which surgical team members 110 may interact (e.g., by way of touch gestures) to provide user input to surgical system 100.

Manipulating system 102, user control system 104, and auxiliary system 106 may be communicatively coupled one to another in any suitable manner. For example, as shown in FIG. 1, manipulating system 102, user control system 104, and auxiliary system 106 may be communicatively coupled by way of control lines 116, which may represent any wired or wireless communication link as may serve a particular implementation. To this end, manipulating system 102, user control system 104, and auxiliary system 106 may each include one or more wired or wireless communication interfaces, such as one or more local area network interfaces, Wi-Fi network interfaces, cellular interfaces, etc.

Figure 2:
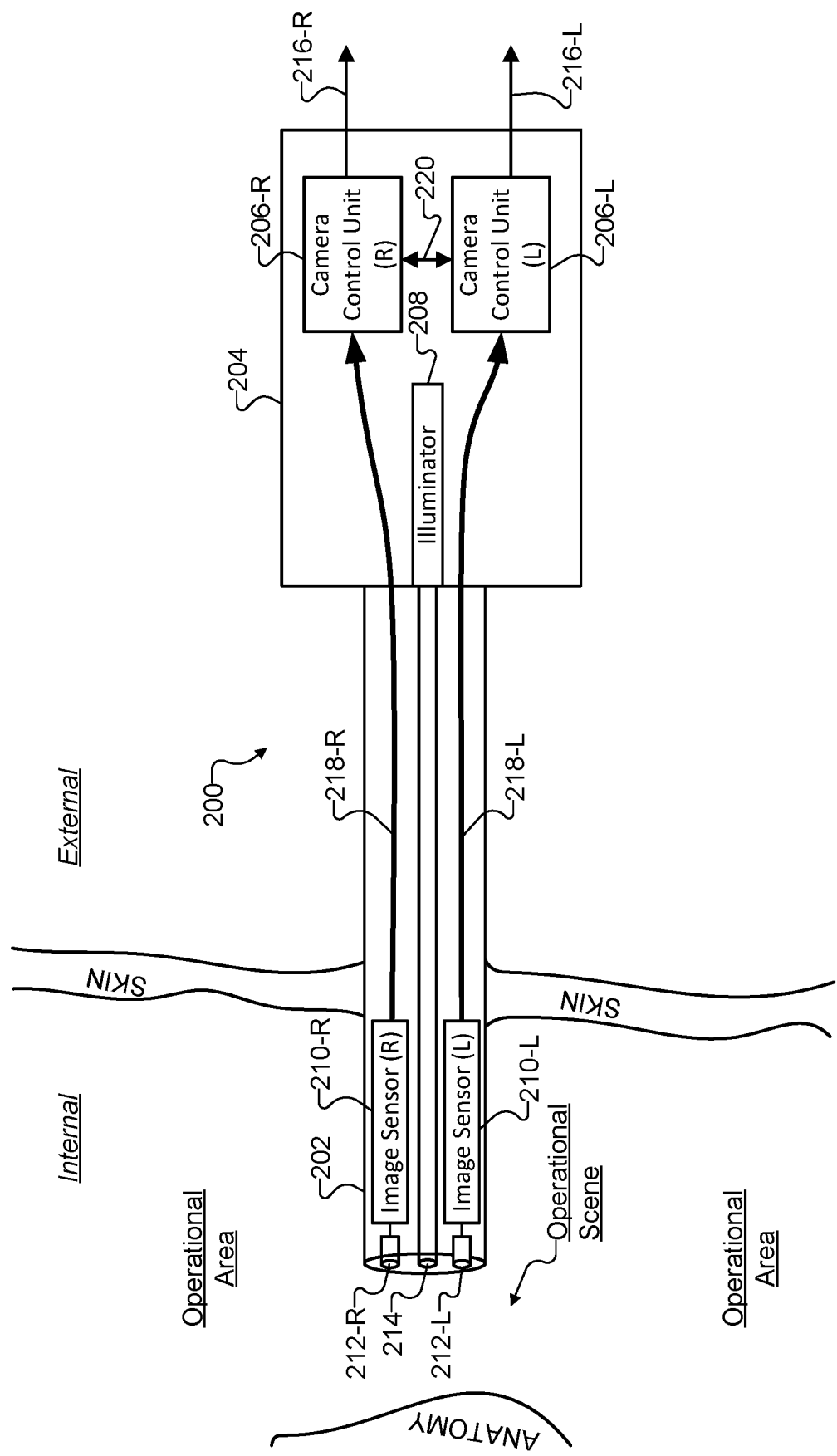
FIG. 2 illustrates an exemplary imaging device located at an operational area associated with a patient according to principles described herein.

FIG. 2 illustrates an exemplary imaging device 200 located at an operational area associated with a patient. Specifically, as shown, imaging device 200 may be implemented as a stereoscopic endoscope. Imaging device 200 may be manually controlled (e.g., by a surgeon performing an operation on a patient). Alternatively, imaging device 200 may be coupled to a manipulator arm (e.g., one of manipulator arms 112) of a computer-assisted surgical system (e.g., surgical system 100), and controlled using robotic and/or teleoperation technology. Imaging device 200 is representative of many different types and/or implementations of endoscopes and other similar imaging tools that may be used with systems and methods described herein.

As shown, imaging device 200 includes a shaft 202 and a camera head 204 coupled to a proximal end of shaft 202. Camera head 204 is configured to be located external to the patient. Shaft 202 has a distal end that is configured to be positioned at (e.g., inserted into) an operational area associated with a patient. In various implementations, shaft 202 is rigid (as shown in FIG. 2). Alternatively, shaft 202 may be jointed and/or flexible.

As shown in the stereoscopic implementation of imaging device 200 in FIG. 2, camera head 204 houses a right-side camera control unit 206-R, a left-side camera control unit 206-L, and an illuminator 208. In some alternative examples, camera control units 206 and illuminator 208 are not included in camera head 204 and are instead located in a controller device communicatively coupled to imaging device 200. The controller device may be implemented by auxiliary system 106, for example.

Shaft 202 houses a right-side image sensor 210-R optically coupled to a right-side optic 212-R, a left-side image sensor 210-L optically coupled to a left-side optic 212-L, and an illumination channel 214. Collectively, the right-side components (i.e., camera control unit 206-R, image sensor 210-R, and optic 212-R) implement a camera that captures images 216-R of an operational scene (e.g., including anatomy located within the operational area) from a right-side perspective. Likewise, the left-side components (i.e., camera control unit 206-L, image sensor 210-L, and optic 212-L) collectively implement a camera that captures images 216-L of the operational scene from a left-side perspective.

To capture images 216, illuminator 208 generates light, which is carried by one or more optical fibers in illumination channel 214 and output into the operational area at a distal end of shaft 202 so as to illuminate the operational scene. Optics 212, which may each be implemented by a lens or other suitable component, capture the light after the light reflects from patient anatomy and/or other objects within the operational scene. In some examples, light used to capture images of the operational scene may originate from another physical light source (e.g., from a different instrument such as a different imaging device, a dedicated lighting tool, or the like). However, because the operational area is internal to the patient (i.e., beneath the skin of the patient, as shown), any physical light source illuminating the operational scene may be located relatively close to (e.g., within a few centimeters of) the operational scene. As such, the operational scene in such internal operational areas may be illuminated by close-range light. As will be described in more detail below, this close-range lighting of the operational scene may result in images 216-R and 216-L that have relatively high dynamic ranges and relatively low brightness uniformity, thereby making the images difficult to see and display (e.g., because the images have various areas that are either too dark or too bright for viewers to easily make out details being depicted). Accordingly, images capturing the operational scene as illuminated by the close-range light of illuminator 208 and illumination channel 214 may be processed by systems for emulating far-range lighting described herein.

The light captured by optics 212 is sensed by image sensors 210. Image sensors 210 may be implemented as any suitable image sensors such as charge coupled device ("CCD") image sensors, complementary metal-oxide semiconductor ("CMOS") image sensors, or the like. Image sensors 210-R and 210-L convert the sensed light into signals (e.g., video data) representative of images, and transmit the signals to camera control units 206 by way of conduits 218-R and 218-L, respectively. Conduits 218 may be any suitable communication link configured to handle high-speed transmission of data.

Camera control units 206 process the signals received from image sensors 210 and generate, based on the signals, data representative of images 216. Camera control units 206 then transmit the data to an external device (e.g., a computing device that processes the images and/or displays the images and/or video formed by the images on a display screen). As shown, camera control units 206 are synchronously coupled to one another by way of a communicative link 220 so that images 216 are synchronized.

Additional or alternative components may be included in imaging device 200. For example, one or more other optics not explicitly shown in FIG. 2 may be included in shaft 202 for focusing, diffusing, transmitting, or otherwise treating light generated and/or sensed by imaging device 200. For instance, in some alternative examples, image sensors 210 may be positioned closer to the proximal end of shaft 202 or inside camera head 204, a configuration commonly referred to as a rod lens endoscope. In these examples, optics may carry light captured at the distal end of shaft 202 along shaft 202 to reach image sensors 210 at their respective locations at a more proximal part of shaft 202, at camera head 204, or at any other location where the image sensors may be located in a particular implementation.

Imaging device 200 may provide data representing visible light captured at an operational scene of an operational area. For example, imaging device 200 may provide data representative of visible light images of the operational scene sensed by imaging device 200. Visible light images may include or be implemented as images using any suitable color and/or grayscale palette to represent a visible light-based view of the operational scene.

Imaging device 200 may also determine and provide data representing depth data of the operational scene, or data that may be processed to derive such depth data. For example, imaging device 200 may capture and provide images of the operational scene that represent depth sensed by imaging device 200. Alternatively, imaging device 200 may capture images of the surgical area that may be processed to derive depth data of the surgical area. For example, images 216-R and 216-L may be stereoscopic images of the operational scene, which images may be processed to determine depth information for the operational scene. The depth information may be represented as a depth map (e.g., a representation of the operational scene obtained using a Z-buffer that indicates distance from imaging device 200 to each pixel in the representation), which may be configured to indicate depths of objects in any suitable way, such as by using different greyscale values to represent different depth values.

Images captured by imaging device 200 and/or derived from images captured by imaging device 200 (e.g., visible light images, depth maps, etc.) may be referred to as "imaging device imagery." Exemplary lighting emulation systems and methods described herein may be configured to utilize imaging device imagery to provide visualizations of anatomical structures, such as described herein.

Imaging device 200 shown in FIG. 2 is illustrative of one imaging device that may be used to obtain imaging device imagery. Any other suitable imaging device or combination of devices from which visible light data and/or depth data of an operational area may be obtained or derived during an operation may be used in other examples.

As mentioned above, a captured image of an operational scene illuminated by close-range light (such as light originating from illuminator 208 and illumination channel 214 in FIG. 2) may tend to have a low uniformity of brightness across the various pixels in the image due, at least in part, to an inverse square law that describes how brightness of light decreases with respect to distance from a light source. Mathematically, this inverse square law is applicable to point sources of light. However, it will be understood that the inverse square law provides a helpful and accurate approximation of brightness associated with light sources that may approximate or be modeled as point sources (e.g., such as illuminator 208 and illumination channel 214 of imaging device 200, a reflection of light from a particular point in an operational scene, etc.), even if such sources are not true point sources. As such, the inverse square law described herein will be understood to be applicable to endoscopic and other light sources described herein, even if, technically speaking, the law describes models that only approximately describe these light sources.

The inverse square law of light dictates that brightness of light decreases with distance from the light source in a non-linear manner. Specifically, the brightness decreases in accordance with an inverse square curve described by an equation of the form of Equation 1, below.

$$\text{Brightness} = \frac{1}{(\text{Distance})^2} \quad \text{(Equation 1)}$$

Certain consequences arise from the brightness of light dropping off with the square of distance from a light source as described in Equation 1. For instance, objects located at a relatively far distance from a light source may be illuminated with great brightness uniformity because variations in distance of different points on the surfaces of the objects from the light source may be negligible. If one point on the object surface is 99 distance units (e.g., 99 cm) from the light source, for example, and another point on the object surface is 100 distance units (e.g., 100 cm) from the light source, Equation 1 shows that the difference in brightness with which these points will be illuminated may be very small (e.g., $1/(99^2)/1/(100^2) = 1.02030$, representing only approximately a 2% difference in brightness illuminating these points). Conversely, however, objects located relatively close to the light source may be illuminated with dramatically decreased brightness uniformity because variations in distance of the different points from the light source may be significant. For example, taking the same object with two surface points one distance unit apart and moving the object toward the light source so that one of the points is one distance unit (e.g., 1 cm) from the light source and the other point is two distance units (e.g., 2 cm) from the light source, Equation 1 shows that the difference in brightness with which the points are illuminated may be much more significant (e.g., $1/(1^2)/1/(2^2) = 4.00000$, representing a difference in brightness where one point is four times brighter than the other point).

Due to this inverse square law, one consequence for capturing images illuminated by close-range light is that a much greater dynamic range may be required to capture, present, and/or view the images than if the images were illuminated by far-range light. This is because, when a surface is relatively close to a light source, relatively small changes in distance of surface points may correspond to relatively large changes in brightness with which the surface points are illuminated. To facilitate presenting captured images of an operational scene, it may thus be desirable for the operational scene depicted in the images to be illuminated by relatively far-range light, such that small changes in distance of surface points may correspond to small (e.g., negligible) changes in brightness with which the surface points are illuminated. However, because it may not be possible, due to the location of an operational scene within an internal operational area, to physically illuminate the operational scene with far-range light, systems and methods described herein may perform processing operations to emulate far-range lighting for operational scenes illuminated by close-range light.

Figure 3:
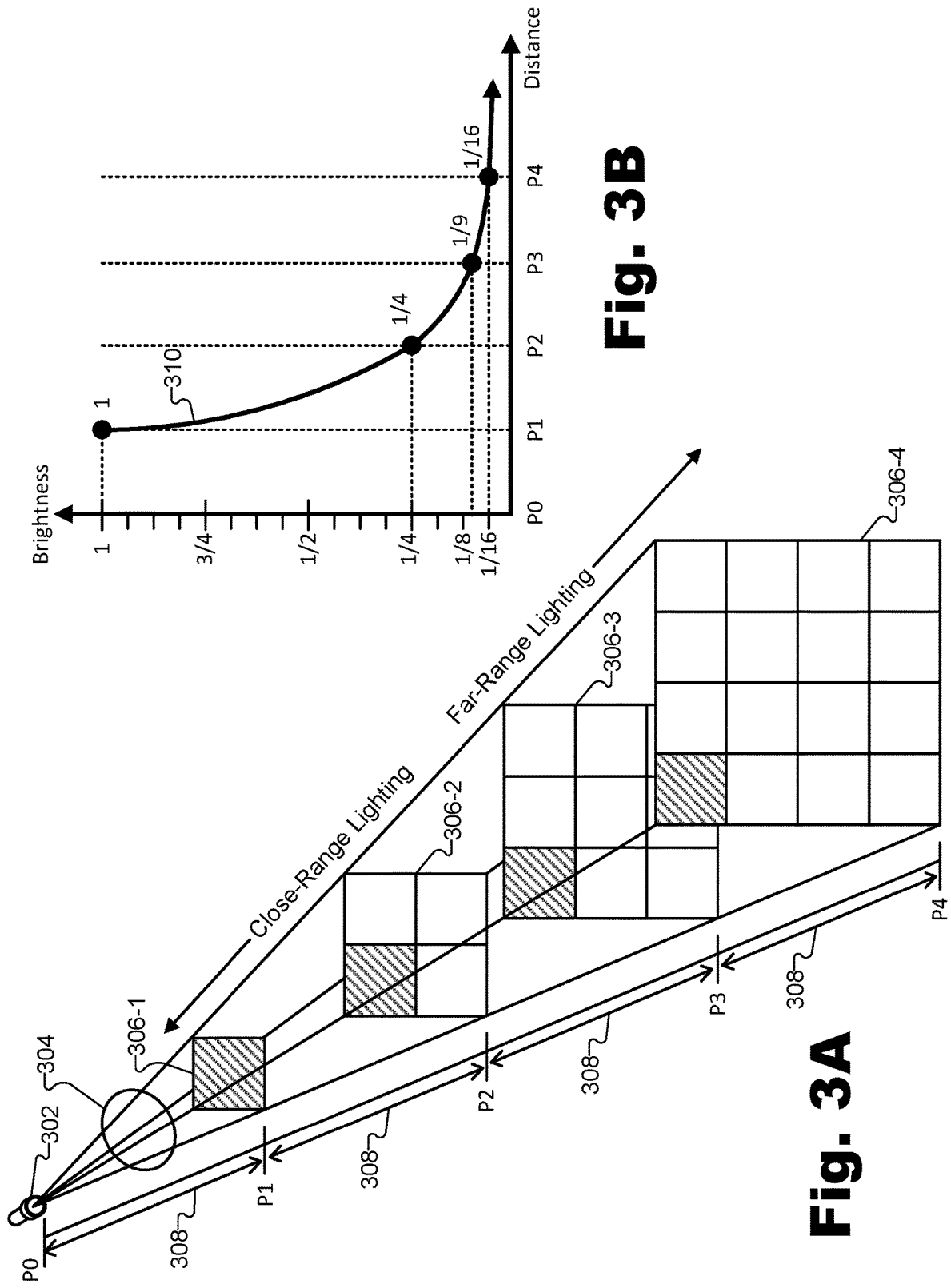
FIGS. 3A and 3B illustrate exemplary aspects of an inverse square law that describes the brightness of light as a function of distance from a light source that originates the light according to principles described herein.

FIGS. 3A and 3B illustrate exemplary aspects of the inverse square law described above in relation to Equation 1 and how the inverse square law relates to the emulation, by systems and methods described herein, of far-range lighting for operational scenes illuminated by close-range light.

Specifically, FIG. 3A shows an exemplary virtual light source 302 that may be modeled as a point source of light and that is originating a sector of light 304 from a virtual position P0 (e.g., a virtual position in space in relation to a position of an operational scene). As shown, light 304 naturally spreads out as it travels from the P0 position outward to other labeled positions (e.g., positions P1, P2, P3, and P4) and beyond. Each of the labeled positions P1 through P4 are shown to be a certain distance 308 apart, and respective portions 306 of an operational scene (i.e., portions 306-1 through 306-4) are shown to represent different-sized portions of the operational scene that are covered by the sector of light 304 if the operational scene were to be located at respective distances of respective positions P1 through P4. For example, at one distance 308 from position P0 (i.e., at position P1), a portion 306-1 having a size of one unit area (i.e., one square) would be large enough to capture the entirety of the sector of light 304. However, at two distances 308 from position P0 (i.e., at position P2), light 304 is shown to spread over a portion 306-2 that has a size of not two unit areas, but $2^2$ unit areas (i.e., 4 squares). Accordingly, as illustrated by the shaded squares, an area the same size as the entire portion 306-1, when positioned at position P2, receives only one-fourth of the light 304 (i.e., is illuminated with one-fourth the brightness). Similarly, a shaded square in portion 306-3 is shown to be illuminated with only one-ninth the brightness of the same sized area if the operational scene is positioned three distances 308 from position P0 (i.e., at position P3), a shaded square in portion 306-4 is shown to be illuminated with only one-sixteenth the brightness of the same sized area if the operational scene is positioned four distances 308 from position P0 (i.e., at position P4), and so forth.

As notated in FIG. 3A, when an operational scene (or portion thereof such as a portion 306) is at a relatively great distance from a light source such as virtual light source 302, the lighting of the operational scene by the light source may be considered to be far-range lighting. Conversely, when an operational scene (or portion thereof) is at a relatively small distance from the light source, the lighting of the operational scene by the light source may be considered to be close-range lighting. Examples of close-range lighting and far-range lighting, as well as how a scene illuminated by close-range light may be made to emulate being illuminated by far-range light, will be described in more detail below.

FIG. 3B depicts a graph illustrating the inverse square law of brightness. Specifically, the graph includes a curve 310 that is plotted with distance of the operational scene from virtual light source 302 along the x-axis and brightness per unit area along the y-axis. As shown, at position P1 (i.e., at one distance 308 from position P0 where light 304 originates), the brightness is one brightness unit, signifying that one unit area receives 100% of the sector of light 304 and is thus at what may be defined for this example as 100% brightness. At position P2 (i.e., at two distances 308 from position P0), the brightness per unit area (e.g., the brightness of one square such as the shaded square) is one-fourth of a brightness unit, signifying that each unit area receives only 25% of the sector of light 304 and is thus at 25% brightness. Similarly, at position P3 (i.e., at three distances 308 from position P0), the brightness per unit area is one-ninth of a brightness unit, signifying that each unit area receives only about 11% of light 304 and is thus at about 11% brightness; at position P4 (i.e., at four distances 308 from position P0), the brightness per unit area is one-sixteenth of a brightness unit, signifying that each unit area receives only about 6% of light 304 and is thus at about 6% brightness; and so forth.

As shown in FIG. 3B, while curve 310 has a steep slope near the y-axis (i.e., near position P0 where light 304 originates), the slope is shown to level off significantly at greater distances. The slope of curve 310 may thus be related to the brightness uniformity and dynamic range of brightness with which the operational scene may be illuminated by a real or virtual light source (e.g., light source 302) when the light source is positioned at a particular distance from the operational scene. Specifically, as the slope of curve 310 gets flatter and flatter at greater distances, the dynamic range of captured images may become less and less and the brightness uniformity greater and greater. This is because the brightness difference between different points on a surface of an object (e.g., different points having small variations in distance) becomes more and more negligible as curve 310 gets flatter at greater distances. As used herein, a dynamic range of an image may be conceptually described and/or actually calculated as a ratio of a brightness of a brightest pixel in the image to a brightness of a dimmest pixel in the image. In contrast, a brightness uniformity may be conceptually described and/or actually calculated as the inverse of the dynamic range. In some examples (including certain examples described below), a few outlying pixels in an image (e.g., those representing a dark crevice, a bright glare, etc.) may be too far to extremes of brightness or dimness to be helpful in expressing a meaningful dynamic range or brightness uniformity value. As such, these pixels may not be accounted for in determining which pixels are the brightest and/or the dimmest in the image, or otherwise in determining or describing a dynamic range or brightness uniformity of an image.

As mentioned above, because operational scenes within internal operational areas such as the operational area illustrated in FIG. 2 may commonly (or by necessity) be illuminated by close-range light for images of the operational scenes to be captured, lighting emulation systems described herein may be configured to process the images to emulate far-range lighting so as to provide an image with a lower dynamic range and higher brightness uniformity. This may result in more attractive and informative images (e.g., images that are brighter but have fewer saturated pixels) and other advantages described above.

Figure 4:
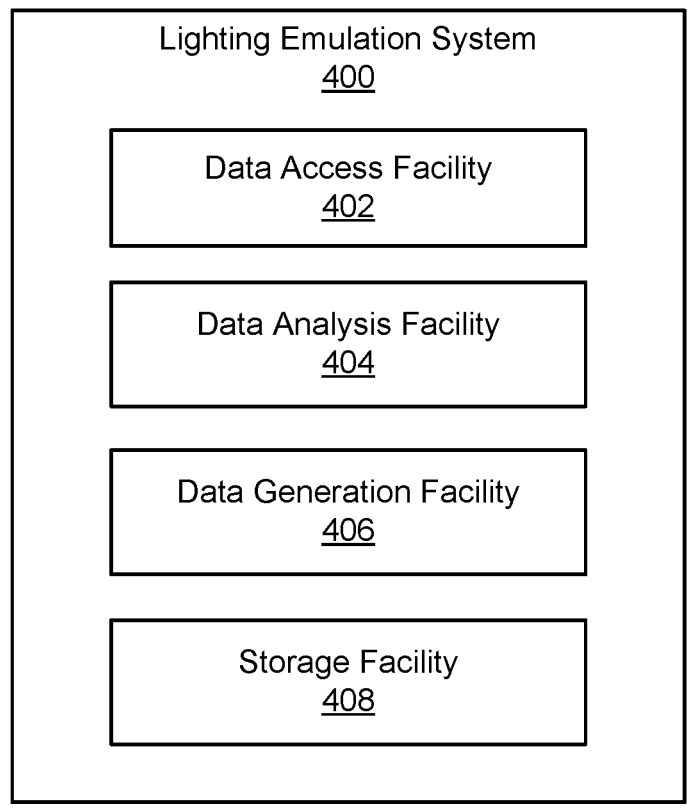
FIG. 4 illustrates an exemplary lighting emulation system for emulating far-range lighting for an operational scene illuminated by close-range light according to principles described herein.

To illustrate one such lighting emulation system, FIG. 4 shows an exemplary lighting emulation system 400 ("system 400") for emulating far-range lighting for an operational scene illuminated by close-range light. As shown, system 400 may include, without limitation, a data access facility 402, a data analysis facility 404, a data generation facility 406, and a storage facility 408 selectively and communicatively coupled to one another. It will be recognized that although facilities 402 through 408 are shown to be separate facilities in FIG. 4, facilities 402 through 408 may be combined into fewer facilities, such as into a single facility, or divided into more facilities as may serve a particular implementation.

Each of facilities 402 through 408 may include or be implemented by one or more physical computing devices such as hardware and/or software components (e.g., processors, memories, communication interfaces, instructions stored in memory for execution by the processors, etc.). The facilities may be implemented using separate computing components unique to each facility, or may be implemented using shared computing components. For instance, in certain examples, each of facilities 402 through 408 may be distributed between multiple devices as may serve a particular implementation. Additionally, one or more of facilities 402 through 408 may be omitted from system 400 in certain implementations, while additional facilities may be included within system 400 in the same or other implementations.

In some examples, facilities 402 through 408 may be configured to operate in real time so as to access and process image data and/or depth data as the data is captured or otherwise generated. As such, system 400 may provide a processed image for presentation on a display screen live and in real time such that, for example, surgical team members may be constantly apprised of what is happening in the internal operational area as an operation (e.g., a surgical procedure) is performed. Operations of facilities 402 through 408 may be performed in real time when they are performed immediately and without undue delay, even if there is some amount of processing delay. Each of facilities 402 through 408 will now be described in more detail.

Data access facility 402 may be configured to perform various operations associated with requesting, communicating, receiving, or otherwise accessing input data for processing by system 400. For example, data access facility 402 may be configured to access an image depicting an operational scene illuminated by close-range light. The image may be captured, for example, by an image sensor (e.g., one of image sensors 210) included within an imaging device (e.g., imaging device 200) located at an operational area that includes the operational scene. As will be described in more detail below, the captured image may, in some examples, be included within a sequence of images, such as by comprising a single frame in a video sequence or the like. In certain examples, system 400 may be separate from an imaging device such as imaging device 200, and may thus access the image by receiving the image from the imaging device. In other examples, system 400 may include or implement an imaging device such as imaging device 200, and may thus access the image by using the integrated imaging device to capture the image.

Along with accessing image data depicting the operational scene, data access facility 402 may further access other types of data (e.g., other types of imaging device imagery) such as depth data included in a depth map of the operational scene. For example, along with each captured image, data access facility 402 may access a depth map that includes depth data corresponding to each pixel in the accessed image. Depth data may be accessed in any manner as may serve a particular implementation, including in any of the ways described above or that will be described below in more detail.

Data analysis facility 404 may be configured to perform various operations associated with analyzing, processing, calculating, computing, or otherwise manipulating data (e.g., data accessed by data access facility 402) to facilitate the emulation of far-range lighting for an operational scene illuminated by close-range light. For example, data analysis facility 404 may be configured to determine, based on the depth map accessed by data access facility 402, a far-range lighting coefficient for each pixel in the image accessed by data access facility 402. Specifically, data analysis facility 404 may determine different far-range lighting coefficients for all the pixels in the image, each coefficient determined based on depth data indicative of a distance of a surface point from a source of close-range light. For instance, each respective pixel in the image may represent a different surface point included in the operational scene, and the far-range lighting coefficient for each respective pixel may be determined based on the corresponding depth data included in the depth map for that respective pixel.

Data generation facility 406 may be configured to perform various operations associated with generating and providing processed data based on the data accessed by data access facility 402 and processed by data analysis facility 404. For example, data generation facility 406 may be configured to generate a processed image depicting the operational scene as being illuminated by far-range lighting, and to provide the processed image for presentation on a display screen (e.g., display monitor 114 of auxiliary system 106 in surgical system 100, a display screen included within user control system 104 in surgical system 100, etc.). The processed image may be generated and provided, for instance, based on the image accessed by data access facility 402 and the far-range lighting coefficients determined by data analysis facility 404 for the pixels included in the image. As will be described in more detail below, by emulating far-range lighting for the operational scene in this way (rather than, for example, merely performing conventional tone mapping operations to reduce the dynamic range based only on the brightness of the captured pixels), data generation facility 406 may generate and provide a processed image that may be preferred (e.g., over images processed using conventional dynamic range compression algorithms) by the surgical team members to whom the processed image is presented. Detailed methods for performing the operations described in relation to facilities 402 through 406 will be described in more detail below.

Storage facility 408 may maintain any suitable data received, generated, managed, analyzed, processed, used, and/or transmitted by facilities 402 through 406 in a particular implementation. For example, storage facility 408 may store or temporarily buffer raw or processed image data, depth data, far-range lighting coefficient data, or other data received, generated, managed, maintained, used, and/or transmitted by facilities 402 through 406. Additionally, storage facility 408 may include program instructions and/or other such data used by facilities 402 through 406 to perform any of the operations described herein.

Figure 5:
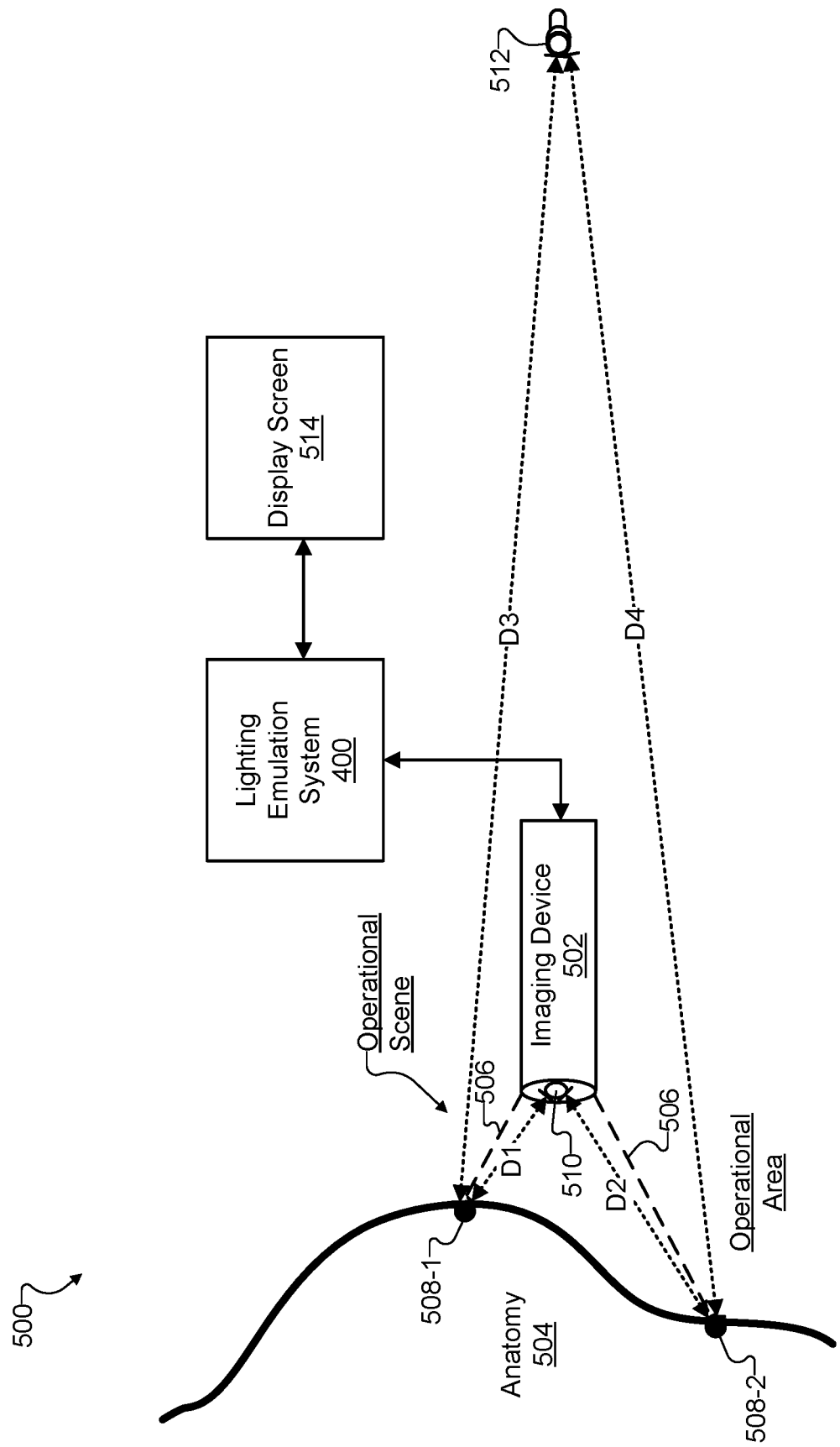
FIG. 5 illustrates an exemplary configuration in which the lighting emulation system of FIG. 4 may operate to emulate far-range lighting for an operational scene illuminated by close-range light according to principles described herein.

FIG. 5 illustrates an exemplary configuration 500 in which system 400 may operate to emulate far-range lighting for an operational scene illuminated by close-range light. Specifically, as shown, configuration 500 includes an imaging device 502 located in an operational area and capturing images of anatomy 504 associated with an operational scene within the operational area. The operational area, as well as the operational scene being imaged within the operational area, may be similar to the operational area and the operational scene described above in relation to FIG. 2. For example, as with the anatomy shown in FIG. 2, anatomy 504 associated with the operational scene of configuration 500 may be internal anatomy within an internal operational area (e.g., an operational area under a patient's skin, which is not explicitly depicted in FIG. 5). In other examples, anatomy 504 may be external anatomy and the operational area may not be completely enclosed by the patient's skin. However, it is noted that it may be possible, in such examples, to provide physical far-range lighting to illuminate the operational scene, rather than emulating such far-range lighting using systems and methods described herein. As such, system 400 may be understood to provide a particular benefit or advantage when the operational area and operational scene are internal to the patient.

Image device 502 may be any suitable imaging device used for providing imaging device imagery of an operational scene. For example, imaging device 502 may be implemented by imaging device 200, described above, or any of the implementations thereof that have been described (e.g., including endoscopes and other similar imaging tools as may be appropriate in different situations, for different types of operations, etc.). As shown, the portion of the operational scene captured by imaging device 502 (e.g., the captured portion of anatomy 504 and/or other objects present in the operational scene such as surgical instruments or the like that are not shown in FIG. 5) may be defined by a field of view 506 of imaging device 502. Field of view 506 may be determined based on various factors including, for example, the position of imaging device 502 with respect to the operational scene, optical characteristics associated with imaging device 502, intrinsic parameters of optics and/or image sensors included within imaging device 502, and so forth.

As shown within field of view 506 (as the dynamic field of view may be constituted at a moment in time depicted in FIG. 5), different surface points 508 (e.g., surface points 508-1 and 508-2) on the surface of anatomy 504 within the operational scene may be different distances from a physical light source 510 from which close-range light originates to illuminate the operational scene. For example, as shown, physical light source 510 may be associated with (e.g., integrated into, implemented by, etc.) imaging device 502 and may be implemented at a distal end of imaging device 502 in the same or a similar way as described above with illuminator 208 and illumination channel 214 in relation to FIG. 2. Close-range light illuminating the operational scene may thus originate from physical light source 510 as physical light source 510 is located at a first position that is a particular distance from various points in the operational scene. For example, as shown, physical light source 510 may be a distance D1 from surface point 508-1 and a distance D2 from surface point 508-2.

Even though the difference between D1 and D2 may be relatively small in quantity (e.g., a few centimeters or less), the difference may be relatively large as a total proportion of the distances. For instance, as shown, D2 is approximately twice as large as D1. Accordingly, due to the close-range light originating from physical light source 510 and in accordance with the inverse square law described above in relation to FIG. 3, light illuminating surface point 508-1 may be approximately four times brighter than the light illuminating surface point 508-2. As a result, the raw image of the operational scene captured by imaging device 502 may have a relatively large dynamic range with certain pixels representative of the region around surface point 508-1 being very bright and other pixels representative of the region around surface point 508-2 being comparatively dim.

For reasons described above, it may be desirable to reduce this dynamic range in such a way as to emulate far-range lighting for images of the operational scene. For example, it may be desirable to process the raw image so as to emulate lighting that, instead of originating at physical light source 510, appears to originate at a virtual light source 512 that is significantly more distant from the operational scene. As shown, for instance, virtual light source 512 may be simulated to be located at a position that is different from the position of physical light source 510 and that is a greater distance from surface points 508 in the operational scene. As with virtual light source 302, described above in relation to FIGS. 3A and 3B, virtual light source 512 may be located at a virtual position in space associated with far range lighting, such as at a distance corresponding to position P4 in FIG. 3A, and/or at a distance where curve 310 has largely flattened out as shown in FIG. 3B.

As will be described in more detail below, far-range lighting may be emulated by determining, for each pixel captured in a raw image, a far-range lighting coefficient that is based on a ratio of the distance of virtual light source 512 to the distance of physical light source 510. Specifically, for example, a distance D3 between surface point 508-1 and virtual light source 512 may be significantly greater than distance D1 between surface point 508-1 and physical light source 510, and a far-range lighting coefficient associated with surface point 508-1 may be based on a ratio of D3 to D1. Similarly, a distance D4 between surface point 508-2 and virtual light source 512 may be significantly greater than distance D2 between surface point 508-2 and physical light source 510, and a far-range lighting coefficient associated with surface point 508-2 may be based on a ratio of D4 to D2.

While the difference between D3 and D4 may be similar in quantity to the difference between D1 and D2, the difference between D3 and D4 may be much smaller than the difference between D1 and D2 as a total proportion of the distances. For instance, while D2 is about 100% greater than D1, D4 may be only a negligible percentage greater than D3. Accordingly, due to the far-range light virtually originating from virtual light source 512 and in accordance with the inverse square law described above in relation to FIG. 3, emulated light illuminating surface point 508-1 may be approximately the same brightness as emulated light illuminating surface point 508-2 when the image is processed by system 400. As a result, the processed image of the operational scene generated by system 400 may have a relatively small dynamic range (e.g., smaller than the dynamic range of the raw image captured by imaging device 502) with pixels representative of regions around both surface points 508 being approximately the same brightness.

Accordingly, FIG. 5 illustrates a primary aim of system 400, which is to generate a processed image that is based on a raw image captured by imaging device 502 of the operational scene, but that emulates far-range lighting that virtually originates at virtual light source 512 in place of the close-range lighting that physically illuminates the operational scene. As used herein, the terms "close-range light" and "far-range light," as well as related terms (e.g., referring to "lighting" rather than "light," etc.), are relative terms best understood in relation to one another and in the context of a particular imaging configuration.

For example, close-range light may refer to light that originates close enough to a point on a surface that other surrounding points at slightly different distances may be illuminated with a significantly different brightness as a result of the inverse square law described above. In the context of operations performed in an internal operational area (e.g., minimally invasive surgical procedures) described in various examples herein, for example, close-range light may refer to light originating only a few centimeters (e.g., less than 10 cm, less than 20 cm, etc.) from an operational scene being imaged.

Far-range light may refer to any light that is not close-range light. For example, far-range light may refer to light that originates far enough from the point on the surface that other surrounding points at slightly different distances may be illuminated with practically the same brightness as a result of the inverse square law. In the context of internal operations described herein, for example, far-range light may refer to light originating more than a few centimeters (e.g., more than 10 cm, more than 20 cm, etc.) from the operational scene being imaged. In certain examples, far-range light may originate at a predefined or user-selected distance that is preferred by a particular surgical team or that simulates a particular lighting scenario such as an open surgery lighting scenario. In other examples, far-range light may originate at great distances so as to emulate, for example, sunlight or the like.

Once system 400 has generated the processed image to emulate far-range lighting originating from virtual light source 512, system 400 may provide the processed image to a display screen 514 such as display monitor 114 of auxiliary system 106, a display screen included within user control system 104 in surgical system 100, or another suitable display screen. In this way, certain or all surgical team members 110 may view an attractive, minimally saturated, and uniformly bright image of the operational scene as they perform the operation.

While system 400 is illustrated as being communicatively coupled to imaging device 502 and display screen 514 in configuration 500, it will be understood that lighting emulation systems described herein, such as system 400, may be implemented by any devices and/or in any manner as may serve a particular implementation. For instance, system 400 may, in certain examples, be implemented by or otherwise integrated with imaging device 502. In other examples, system 400 may be implemented or integrated with auxiliary system 106, user control system 104, or any other suitable component of surgical system 100 or other computing device as may serve a particular embodiment.

Additionally, in certain examples, it will be understood that a lighting emulation system may include more than just the computing resources described above (e.g., processors, memories, etc.). For instance, one exemplary implementation of a lighting emulation system may include an imaging device configured to be located at an operational area that includes an operational scene; a physical light source associated with the imaging device and configured to illuminate the operational scene; an image sensor included within the imaging device and configured to capture an image depicting the operational scene as illuminated by close-range light originating from the physical light source; a display screen configured to present images captured by the imaging device; a processor communicatively coupled to the imaging device; and a memory communicatively coupled to the processor and storing instructions that are executable by the processor to direct the processor to perform any of the operations described herein. For example, the processor, under direction of the instructions stored by the memory, may direct the imaging device to capture, by way of the image sensor, an image depicting the operational scene as illuminated by the close-range light originating from physical light source; generate, based on the image depicting the operational scene, a depth map of the operational scene that includes depth data corresponding to each pixel in the image; determine, based on the depth map, a far-range lighting coefficient for each pixel in the image (e.g., in which the (ar-range lighting coefficient for each respective pixel is determined based on the corresponding depth data included in the depth map for that respective pixel); generate, based on the image and the far-range lighting coefficient for each pixel in the image, a processed image depicting the operational scene as being illuminated by far-range lighting; and provide the processed image for presentation on the display screen.

Figure 6:
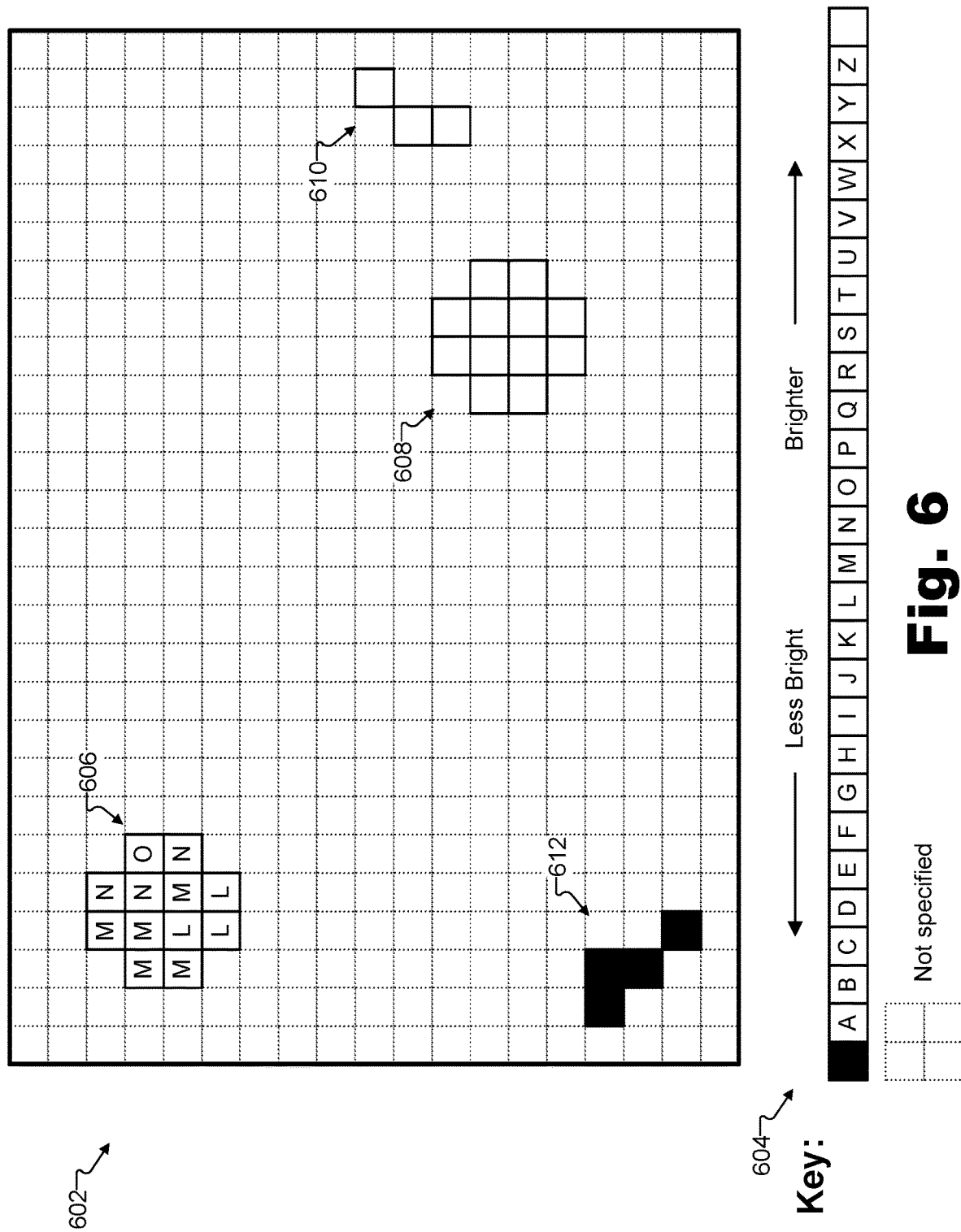
FIGS. 6 and 7 illustrate exemplary brightness values of certain pixels of respective exemplary images that depict, in accordance with different respective exposure algorithms, an operational scene illuminated by close-range light according to principles described herein.
Figure 7:
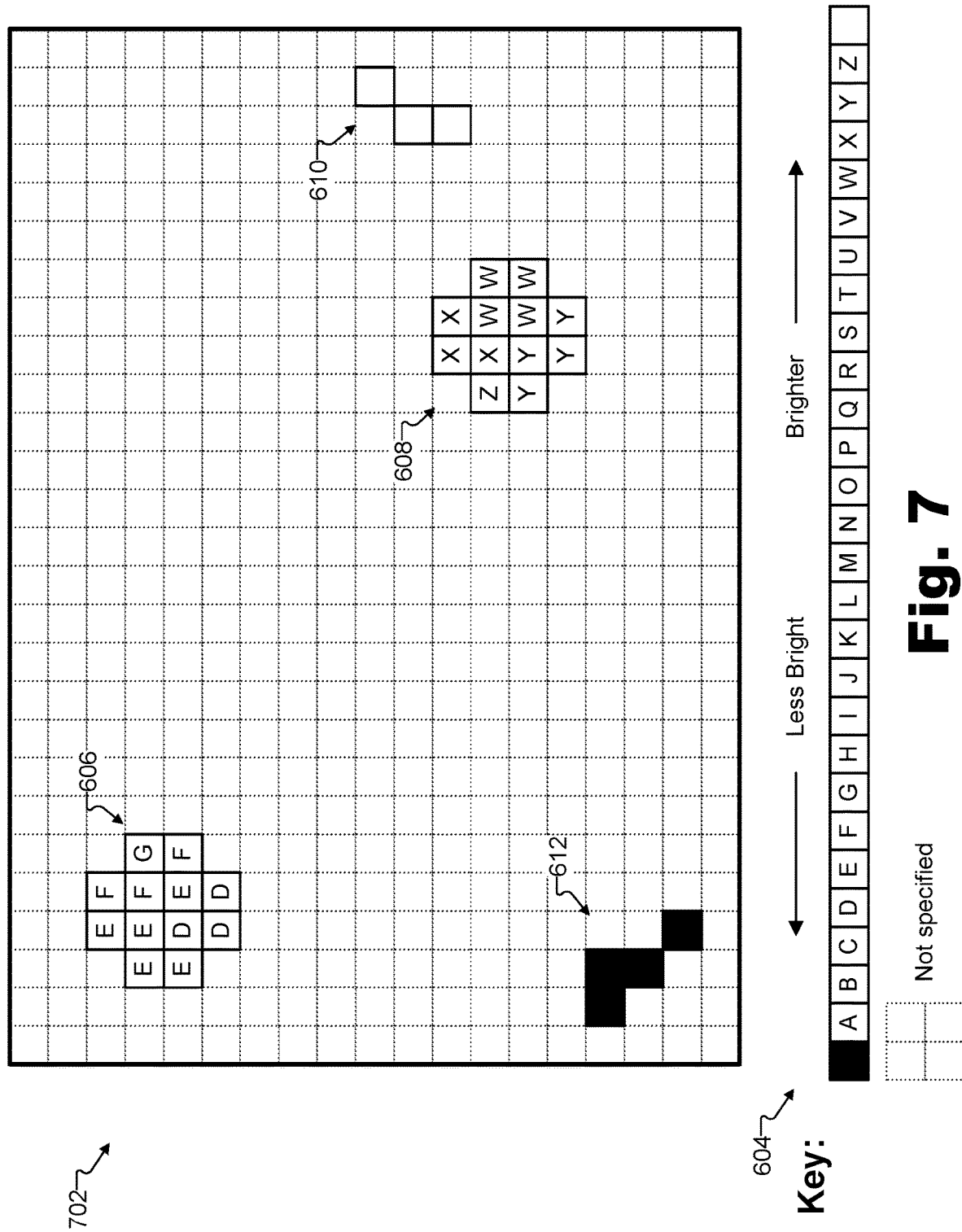
Figure 8:
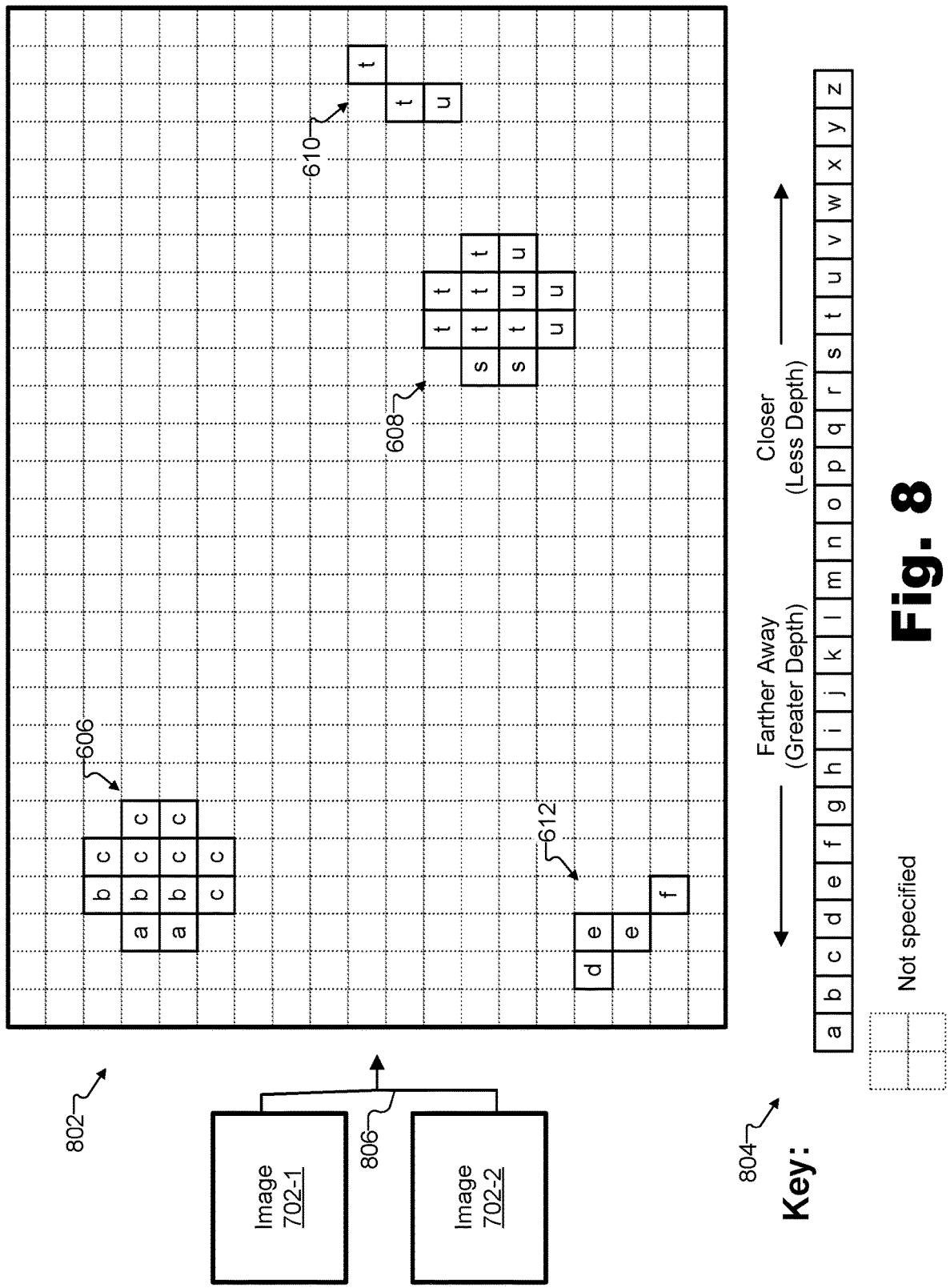
FIG. 8 illustrates exemplary depth data stored in an exemplary depth map according to principles described herein.

Various exemplary details of how system 400 may perform the emulating of far-range lighting for operational scenes illuminated by close-range light within configurations such as configuration 500 will now be described. Specifically, FIGS. 6 and 7 illustrate exemplary brightness values of certain pixels of different exemplary images that depict an operational scene illuminated by close-range light. In particular, as will be described, FIG. 6 illustrates exemplary brightness values for an image captured using one exposure algorithm, while FIG. 7 illustrates corresponding brightness values for an exemplary image captured using a different exposure algorithm, FIG. 8 illustrates exemplary depth data stored in an exemplary depth map that may be generated, received, or otherwise accessed by system 400. Based on the images and depth map illustrated in FIGS. 6 through 8, FIG. 9 illustrates an exemplary dataflow for operations performed by an exemplary implementation of system 400. Ultimately, the dataflow of FIG. 9 leads system 400 to generate a processed image. Accordingly, FIG. 10 shows exemplary brightness values of certain pixels of the processed image that results from processing a raw image in accordance with the dataflow of FIG. 9.

Referring now to FIG. 6, brightness values of certain pixels included in an image 602 are shown. As used herein, a "picture element" ("pixel" for short) may refer to any element of an image or depth map as may serve a particular implementation. For instance, in certain examples, a pixel may refer to a single point included within an image or a depth map. In other examples, a pixel may refer to a grouping of related points within the image or depth map. As one example, a single color pixel within an image may include a red point, a green point, and a blue point. As another example, a pixel within an image or depth map may include a grouping of related points within an area of the image or depth map. For instance, if multiple points in a region of an image are determined to have a same depth or to correspond with a single pixel of a corresponding depth map, all the points may be processed together as a single picture element. By processing groupings of related points together, rather than individually, in this way, system 400 may process images and/or depth maps more effectively and/or efficiently. Additionally, grouping points together into processable picture elements in this way may allow system 400 to operate with a relatively high degree of flexibility so as to not require, for example, that each point making up a particular image correspond one-to-one with a particular point making up a corresponding depth map. For instance, by grouping multiple image points into each of the "pixels" processed in the ways described herein, system 400 may flexibly correlate a relatively low resolution depth map with an image having a higher resolution (e.g., possibly after performing post-filtering to, for example, remove noise in the depth data, smooth the depth map, fill holes, etc.).

Image 602 will be understood to be a "raw" image (i.e., an image captured by imaging device 502 and which has not yet been processed by system 400 to alter the brightness of any pixel). For example, image 602 may be captured by either a right-side or a left-side image sensor if imaging device 502 is a stereoscopic imaging device, or by a monoscopic image sensor if imaging device 502 is a monoscopic imaging device.

As illustrated by a key 604 under image 602, different upper-case letters "A" through "Z" are used to illustrate different brightness values for each pixel in image 602. The pixels are represented by the small squares making up image 602. As indicated by key 604, pixels representing relatively dim ("Less Bright") points of an operational scene are marked with earlier letters in the alphabet (e.g., "A," "B," "C," etc.), with pixels representing areas so dim that no appreciable amount of light is detected by the image sensor being depicted as black squares. In contrast, pixels representing relatively bright ("Brighter") points of the operational scene are marked with later letters in the alphabet (e.g., "Z," "Y," "X," etc.), with pixels representing areas so bright the image sensor saturates being depicted as white squares.

Also shown in key 604 are pixels outlined by dotted, rather than solid, lines. These pixels will be understood to have brightness values that are similar to the values of the pixels outlined with solid lines, even though these values are not explicitly specified in FIG. 6 for clarity of illustration. Instead, brightness values are specified only for a few select groups of pixels within image 602 to illustrate principles described below. Specifically, as shown, a pixel group 606 includes pixels with a mid-range of brightness (e.g., values from "L" to "O"), a pixel group 608 and a pixel group 610 include pixels that are so bright as to be saturated (e.g., appearing as a glare or "hot spot" in the image), and a pixel group 612 includes pixels that are so dim as to not include any information.

The brightness values illustrated in FIG. 6 may represent the brightness captured when the imaging device uses a conventional auto-exposure algorithm to make the majority of pixels in image 602 take on a brightness value as close to a mid-range value as possible. Using this auto-exposure algorithm, pixels in pixel group 606 may be captured with a brightness level that looks attractive to viewers of image 602 (i.e., a brightness level that is not so bright as to appear washed out while also being not so dim as to make it difficult for a viewer to perceive detail in the image). While most pixels in image 602 are not specified for clarity of illustration, it will be understood that the conventional auto-exposure algorithm may also make many other pixels in image 602 look similarly attractive to viewers. However, as shown, it will also be understood that, regardless of what exposure algorithm is used, certain pixels may be brighter or dimmer than others for various reasons including reasons that may be unrelated to depth variations in the operational scene. For example, pixels in pixel group 610 may represent an area of the operational scene in which light is directly reflected at the imaging device to create a glare that would saturate these pixels using any practical exposure algorithm. Similarly, pixels in pixel group 612 may represent an area (e.g., a dark crevice, etc.) of the operational scene in which light is absorbed so as not to reflect any amount of light detectable using any practical exposure algorithm.

Pixel group 608, however, may be in a different situation than pixel groups 610 and 612. While pixel groups 610 and 612 may practically always fall to one brightness extreme or the other by the nature of the content being depicted by these pixel groups, pixel group 608 may only be saturated as a result of the exposure time (e.g., the exposure time implemented by the auto-exposure algorithm) being too long for that portion of image 602. Accordingly, in the case of pixel group 608, if the exposure time were to be shortened, it may be possible for the pixels in pixel group 608 to provide useful information rather than to saturate as shown in image 602.

To illustrate, FIG. 7 shows an image 702 that depicts the same content (e.g., the same objects within the same operational scene) as image 602, but is captured using an exposure algorithm that is configured to expose the image for a shorter time than the exposure algorithm associated with image 602. For example, prior to accessing image 702 depicting the operational scene, system 400 may direct the imaging device to capture image 702 using an exposure algorithm configured to underexpose the image to minimize saturation of the pixels in the image. While the exposure algorithm of FIG. 6 may represent a conventional auto-exposure algorithm configured to optimize the brightness of as many pixels in the image as possible, the exposure algorithm of FIG. 7 may, by design, underexpose the image so that many pixels may appear darker than may be preferred by typical viewers. The advantage of this underexposure, however, is that the exposure algorithm of FIG. 7 may capture more information than the exposure algorithm of FIG. 6, thereby allowing more pixels to be meaningfully processed and adjusted by system 400 (after which the brightness may be readjusted to a more preferred level, as will be described in more detail below).

To illustrate, for example, meaningful brightness values of the pixels in pixel group 606 are still represented in image 702, even though these pixels may appear relatively dark to a viewer viewing image 702. Specifically, rather than the mid-range brightness values of these pixels shown in image 602 (e.g., from "L" to "O"), the pixels have dimmer brightness values in image 702 (e.g., from "D" to "G"). However, whereas the pixels in pixel group 608 were saturated in image 602 so as to not provide any useful information, these pixels represent meaningful brightness values (albeit very bright values from to "Z") in image 702. As shown in FIG. 7, and for the reasons described above, other pixels such as the pixels in pixel group 610 may still be saturated while pixels in pixel group 612 may still be too dark to provide useful information.

The exposure algorithm used to capture image 702 may be implemented using any criteria as may serve a particular implementation. For example, in some implementations, the exposure algorithm may be configured to underexpose the image based on the brightest areas being captured (e.g., to minimize saturated pixels). In other implementations, the exposure algorithm may be configured to maximize the amount of meaningful data that is captured by underexposing the image but only to the extent that more brightness data is captured rather than less data (which could happen, for example, if too many relatively dim pixels were underexposed so as to not provide any useful brightness data). In this way, the exposure algorithm may account for pixels near both extremes of brightness to gather as much brightness information as possible given the dynamic range of the imaging device.

As mentioned above, along with accessing an image (e.g., such as image 602 or image 702) from imaging device 502, system 400 may further access a depth map. The depth map may be generated in any suitable manner and/or by any device as may serve a particular implementation. For example, in certain implementations, the depth map may be captured by a depth imaging tool separate from imaging device 502 or integrated with imaging device 502. Such a depth imaging tool may use a time-of-flight depth capture technique, for example, or any other depth capture technique as may serve a particular implementation.

In other examples, no specialized depth imaging tool may be necessary to generate the depth map, but, rather, the depth map may be generated based on a plurality of images captured by imaging device 502 from different vantage points (e.g., stereoscopic vantage points). For instance, system 400 may access the depth map of the operational scene by accessing a first image and a second image from imaging device 502, where the first and second images depict the operational scene from stereoscopic vantage points having a predetermined spatial relationship. System 400 may further compare the first image to the second image and generate the depth map based on the comparison of the first image to the second image.

FIG. 8 shows a depth map 802 that includes depth data corresponding to each of the pixels of images 602 and 702 described above. Similar to images 602 and 702, depth map 802 is associated with a key 804 under depth map 802 that sets forth the notation used in FIG. 8. Specifically, as illustrated by key 804, different lower-case letters (e.g., "a" through "z") are used to illustrate different depth data values for each pixel in depth map 802. As with images 602 and 702, the pixels of depth map 802 are represented by the small squares making up depth map 802. As indicated by key 804, pixels representing relatively distant ("Farther Away") points of an operational scene are marked with earlier letters in the alphabet (e.g., "a," "b," "c," etc.). In contrast, pixels representing relatively near ("Closer") points of the operational scene are marked with later letters in the alphabet (e.g., "z," "y," "x," etc.).

Also shown in key 804 are pixels outlined by dotted, rather than solid, lines. As with similar pixels in images 602 and 702, these pixels will be understood to have values (depth values, in this case) that are similar to the values of the pixels outlined with solid lines, even though the values are not explicitly specified in FIG. 8 for clarity of illustration. Instead, depth values are specified only for the same select groups of pixels explicitly shown in images 602 and 702 (i.e., pixel groups 606, 608, 610, and 612).

As shown, pixel group 606 in depth map 802 may be relatively far away from the vantage point of the tool capturing depth map 802 (e.g., imaging device 502). Specifically, as shown, pixel group 606 includes depth values "a" through "c". At least partially because of this depth, and as shown in FIGS. 6 and 7, pixels in pixel group 606 may be relatively dim compared to other pixels in the images such as those in pixel group 608. In contrast, pixel group 608 in depth map 802 may be relatively near the vantage point of the tool capturing depth map 802. Specifically, as shown, pixel group 608 includes depth values "s" through "u". At least partially because of this depth, and as shown in FIGS. 6 and 7, pixels in pixel group 608 may be relatively bright compared to other pixels in the images such as those in pixel group 606. Pixels in pixel groups 610 and 612 also are shown to be associated with respective depth data, although it will be appreciated that the respective brightness extremes of these pixel groups appear to have more to do with the nature of the content being depicted (e.g., glares, dark crevices, etc.) than the depth of the content being depicted (which, as shown, may not be particularly extreme).

Next to depth map 802 in FIG. 8, an analysis 806 of two images 702 (i.e., images 702-1 and 702-2) is shown to be the source from which depth map 802 is derived. Images 702-1 and 702-2 will be understood to be the same or similar to image 702 illustrated in FIG. 7 in that an exposure algorithm configured to minimize pixel saturation and/or maximize captured brightness information may be used to generate these images. However, it will also be understood that images 702-1 and 702-2 are not identical, but, rather, are stereoscopically distinct from one another. Accordingly, as mentioned above, depth map 802 may be generated by comparing images 702-1 and 702-2 and/or otherwise processing the images using any type of stereoscopic depth derivation algorithm as may serve a particular implementation.

Images 702 in FIG. 8 may be stereoscopic images that are captured from different, but related, vantage points to allow captured features in the images to be correlated and depth to be determined based on a known relationship between the vantage points. The stereoscopic images may be captured in any manner and by any device (e.g., any imaging device with any configuration of one or more image sensors) as may serve a particular implementation. For instance, in some implementations, imaging device 502 may be a stereoscopic imaging device such as imaging device 200 that includes a first image sensor and a second image sensor that is stereoscopic with the first image sensor such that the first and second image sensors together capture sets of synchronized stereoscopic images (i.e., stereoscopic images captured at approximately the same moment in time). In these implementations, the images 702-1 and 702-2 may thus be included within a particular set of synchronized stereoscopic images captured by the first and second image sensors within the stereoscopic implementation of imaging device 502.

In other implementations, imaging device 502 does not necessarily need to be a stereoscopic imaging device. For instance, image 702-1 may be captured at a first time by an image sensor included within a monoscopic or stereoscopic implementation of imaging device 502, and image 702-2 may be captured at a second time by the same image sensor included within the monoscopic or stereoscopic implementation of imaging device 502, where the second time is distinct from the first time. For example, as the imaging device 502 is moved within the operational area to capture different portions of the operational scene, different images may be captured from slightly different vantage points, and these images may be used as images 702-1 and 702-2 from which depth map 802 is derived by way of analysis 806. For example, the relationship between the vantage points in this example may be determined based on kinematic data or in any other suitable manner.

As described above, once data access facility 402 in system 400 accesses an image such as image 702 and a depth map such as depth map 802, data analysis facility 404 and data generation facility 406 may process the image and the depth map to generate a processed version of the image and to provide the processed image for presentation on a display screen.

Figure 9:
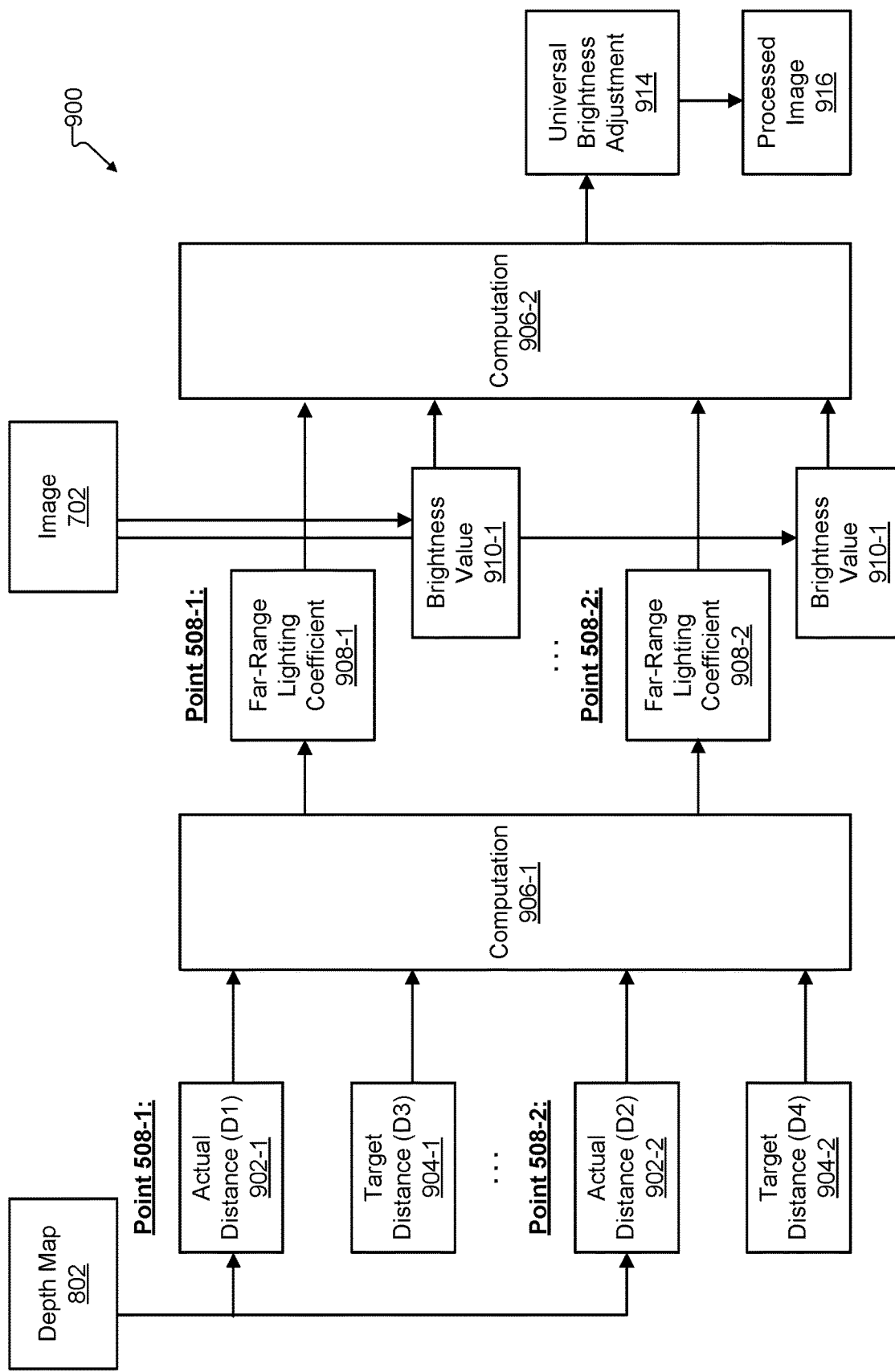
FIG. 9 illustrates an exemplary dataflow for operations performed by an exemplary implementation of the lighting emulation system of FIG. 4 according to principles described herein.
Figure 10:
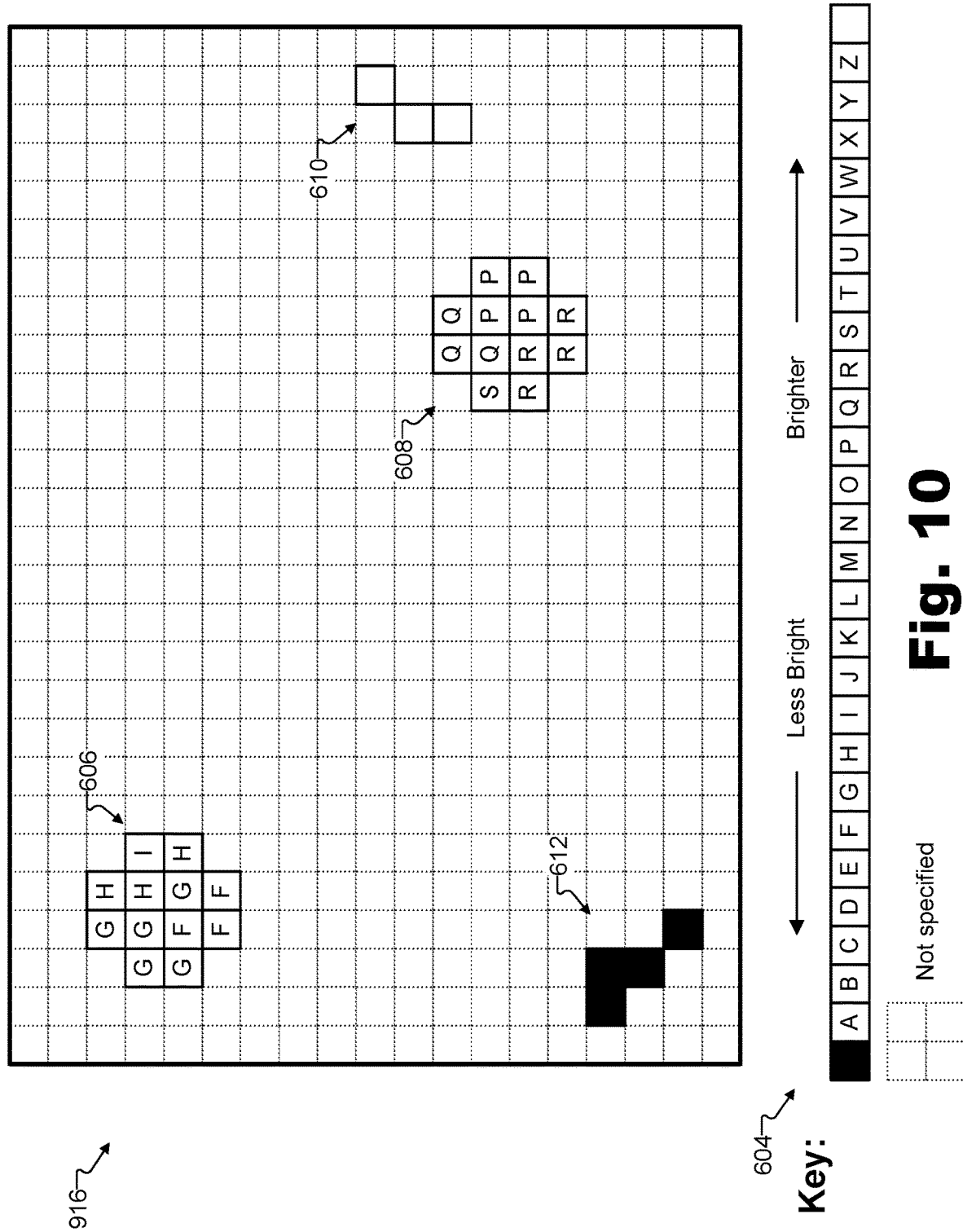
FIG. 10 illustrates exemplary brightness values of certain pixels of an exemplary processed image after a raw image is processed in accordance with the dataflow of FIG. 9 according to principles described herein.

To illustrate, FIG. 9 shows an exemplary dataflow 900 used by facilities 404 and 406 within system 400 as the processed image is generated and provided. Starting at the left and moving toward the right, dataflow 900 shows that accessed depth map 802 may be used to identify detected depth data (e.g., "Actual Distances") of various points included in the operational scene. Specifically, dataflow 900 depicts the flow for data associated with two particular points of an operational scene: surface points 508-1 and 508-2 illustrated above in relation to FIG. 5. As shown, an actual distance 902-1 between surface point 508-1 and a physical light source illuminating the operational scene (e.g., physical light source 510) is identified based on depth data included within depth map 802, and an actual distance 902-2 between surface point 508-2 and the physical light source is also identified based on depth data from depth map 802. More particularly, as annotated in FIG. 9, actual distance 902-1 will be understood to correspond to distance D1 illustrated in FIG. 5, while actual distance 902-2 will be understood to correspond to distance D2. While data for surface points 508 is shown exclusively in dataflow 900 for illustrative clarity, it will be understood that surface points 508 are exemplary only, and that system 400 may perform similar operations for every surface point depicted by every pixel in depth map 802 and image 702, and not just those pixels depicting surface points 508-1 and 508-2.

Along with actual distances 902, dataflow 900 also shows target distances 904 corresponding to surface points 508 (i.e., target distance 904-1 corresponding to surface point 508-1 and target distance 904-2 corresponding to surface point 508-2). Target distances 904 represent respective distances from surface points 508 to a position of virtual light source 512, which, as described above in relation to FIG. 5, virtually originates far-range light that system 400 is configured to emulate. Accordingly, as annotated, target distance 904-1 will be understood to correspond to distance D3 illustrated in FIG. 5, while target distance 904-2 will be understood to correspond to distance D4.

Target distances 904 (and, thus, the virtual position of virtual light source 512 that the target distances serve to define) may be accessed or determined by system 400 in any manner as may serve a particular implementation. For example, a predefined position a certain distance from the operational scene may be used to define target distances 904. In one embodiment, for instance, target distances 904 may be two meters from the operational scene or some other specific value that may serve a particular implementation. As another example, target distances 904 may be set to be a predefined (e.g., statically set or user selected) distance configured to emulate a certain lighting environment. For instance, as mentioned above, target distances 904 may be defined to virtually locate virtual light source 512 at a position emulating a position of a light source that would be used in an open surgery.

In other implementations, target distances 904 may not be predefined, but, rather, may be dynamically configurable by a user such as a surgeon performing an operation or a surgical team member associated with the operation. Specifically, for instance, system 400 may be configured to prompt a user of system 400 to provide input, and to receive, from the user, user input representative of a user selection of the position at which the virtual light source is simulated to be located. System 400 may then define the virtual light source position based on the user input by, for instance, defining target distances 904 in accordance with the position selected by the user and the depth data for each point provided by depth map 802.

In prompting the user to provide the user input representative of the user selection of the position at which the virtual light source is to be simulated to be located, system 400 may use any user interfaces as may serve a particular type of user (e.g., a surgeon using user control system 104, another surgical team member using auxiliary system 106, etc.) in a particular implementation. For example, in some examples, a physical or graphical slider input tool (e.g., implemented by a touch screen or other suitable input mechanism) may be provided for presentation within a user interface presented to the user of the system. The slider input tool may be configured to facilitate the user selection of the virtual light source position, and system 400 may define the position at which the virtual light source is simulated to be located based on a setting of the slider input tool selected by the user. In some examples, the slider input tool may be presented to the user in terms of a position of a virtual light source (e.g., by being labeled "Virtual Light Source Distance," or the like), while, in other examples, the details of what is being simulated may be abstracted away from the user to some extent (e.g., by labeling the slider input tool "Dynamic Contrast," or the like).

A computation 906-1 is shown in dataflow 900 to receive as input the actual distances 902 and target distances 904, and to use this data to compute respective far-range lighting coefficients 908 for each point (e.g., a far-range lighting coefficient 908-1 for surface point 508-1 based on distances 902-1 and 904-1, a far-range lighting coefficient 908-2 based on distances 902-2 and 904-2, etc.). As such, computation 906-1 may be performed by data analysis facility 404 to perform the operations described above in relation to FIG. 4.

Each far-range lighting coefficient 908 may be implemented as a customized multiplier for a particular pixel in a raw image such as image 702. Each far-range lighting coefficient takes into account 1) a distance from a physical light source to the point depicted by the pixel, and 2) a distance from a virtual light source to the point depicted by the pixel, such that, when multiplied by a raw brightness value captured for the pixel, the far-range lighting coefficient adjusts the brightness of the pixel to emulate the point depicted by the pixel as being illuminated by the far-range light of the virtual light source. Because far-range lighting coefficients do not arbitrarily brighten dim pixels and/or dim bright pixels, but, rather, facilitate an emulation of how each pixel would depict its respective surface point if the operational scene were illuminated by the virtual light source, far-range lighting coefficients facilitate the generation of a processed image that not only has high brightness uniformity, but also that looks attractive and realistic, rather than distractingly artificial or unnatural.

Computation 906-1 may determine far-range lighting coefficients 908 in any manner as may serve a particular implementation. For example, as mentioned above, system 400 may determine each far-range lighting coefficient for each surface point based on a ratio of the target distance 904 for that point to the actual distance 902 for that point. Specifically, a far-range lighting coefficient for a particular surface point 508 may be computed based on Equation 2, set forth below.

$$FRLC(D_1, D_2) \cong \frac{1}{\left(\frac{D_2}{D_1}\right)^2} \quad \text{(Equation 2)}$$

In Equation 2, $FRLC(D_1, D_2)$ represents a far-range lighting coefficient for a particular point (e.g., one of surface points 508) that is a distance D1 from a physical light source and a distance D2 from a virtual light source that is to be simulated to be illuminating the point. Taking surface point 508-1 as an example, D1 in Equation 2 corresponds to actual distance 902-1 (i.e., D1 in FIG. 5) and D2 in Equation 2 corresponds to target distance 904-1 (i.e., D3 in FIG. 5). Using surface point 508-2 as an additional example, D1 in Equation 2 corresponds to actual distance 902-2 (i.e., D2 in FIG. 5) and D2 in Equation 2 corresponds to target distance 904-2 (i.e., D4 in FIG. 5). Computation 906-1 may compute respective far-range lighting coefficients 508 for each point represented in depth map 802 and/or image 702 in this way.

It will be noted, as indicated in Equation 2, that the value computed as the inverse of the square of the ratio of D2 to D1 may be approximately, but not necessarily exactly, equal to an ideal far-range lighting coefficient that would precisely emulate far-range lighting from the virtual light source. This is because, as described above, the physical light source closely approximates a point light source but is not a true mathematical point light source. Additionally, the point being captured does not actually originate close-range light, but rather reflects close-range light originated by the physical light source. Nevertheless, far-range lighting coefficients computed using Equation 2 provide good approximations to ideal far-range lighting coefficients and may advantageously be computed with relative efficiency in comparison to far-range lighting coefficients computed based on more complex and comprehensive models. It will be understood, however, that in implementations where more precision is desired and computation resources are available to support such precision, more precise models and complex equations may be used in place of Equation 2.

In computation 906-2, far-range lighting coefficients 908-1 and 908-2 may be combined (e.g., multiplied) with respective brightness values 910-1 and 910-2 accessed based on a captured raw image (e.g., image 702). Because, as described above, image 702 may be captured using an exposure algorithm configured to minimize saturated pixels and/or to maximize the amount of brightness information captured, all or nearly all of the computed far-range lighting coefficients 908 may be combined with captured brightness values representing meaningful data (e.g., rather than representing a saturated or dark pixel). Computation 906-2 may be performed by data generation facility 406 in system 400. Specifically, computation 906-2 may be performed sequentially or in parallel for each respective pixel (x, y) included in image 702 by multiplying a respective brightness value 910 of each respective pixel in image 702 by the computed far-range lighting coefficient 908 determined for that respective pixel in accordance with Equation 3 set forth below.

$$B_P(x,y)=B_U B_R(x,y)\text{FRLC}(D_1(x,y)D_2(x,y)) \quad \text{(Equation 3)}$$

In Equation 3, $B_P(x,y)$ represents the processed brightness of a pixel (x,y) in image 702. More specifically, the brightness value of $B_P(x,y)$ is the brightness of that pixel when the far-range light virtually originating from the virtual light source is emulated in the depiction of the point depicted by pixel (x,y). $\text{FRLC}(D_1(x,y), D_2(x,y))$ represents a far-range lighting coefficient 908 for pixel (x,y) computed by computation 906-1 in accordance with Equation 2, as described above. As shown, this value is multiplied by $B_P(x,y)$, which represents the raw brightness value 910 of pixel (x,y) based on image 702. By multiplying each raw brightness value 910 by a respective far-range lighting coefficient 908 in this way, the resultant processed brightness of the pixels may be more uniform than the raw brightness of the pixels as captured in image 702. As such, if image 702 as captured by the imaging device is associated with a first dynamic range, a processed image including pixels adjusted in accordance with Equation 3 will be associated with a second dynamic range that is less than the first dynamic range.

Because the virtual light source is positioned farther away from the surface point being depicted than the physical light source (i.e., because D2 is greater than D1), it will be recognized that far-range lighting coefficients 908 computed using Equation 2 are greater than 0 and less than 1. For example, a far-range lighting coefficient of 0 would represent a virtual light source that is infinitely far away, while a far-range lighting coefficient of 1 would represent a virtual light source positioned exactly at the same position as the physical light source. When such far-range lighting coefficients 908 are multiplied by brightness values 910, the resultant product is thus attenuated from (i.e., less than) the raw brightness value 910. Moreover, as described above in relation to FIG. 7, raw brightness values 910 associated with image 702 may already be intentionally underexposed to some degree so as to minimize saturated pixels in the raw image and maximize the captured information. Consequently, while the product of respective far-range lighting coefficients 908 and brightness values 910 may be relatively uniform for various pixels and may provide a relatively small dynamic range, the resultant image may appear very dim to a user viewing the image.

To remedy this, Equation 3 includes an additional factor $B_U$ representative of a universal brightness adjustment that may be made to brighten up all the pixels in the resultant image by the same amount. As such, $B_U$ will be understood to be a constant, rather than a function of pixel (x,y), as with other factors included in Equation 3.

Dataflow 900 illustrates a universal brightness adjustment 914 that may be performed on the respective products of far-range lighting coefficients 908 and brightness values 910 multiplied in computation 906-2. As mentioned above and as shown by $B_U$ in Equation 3, universal brightness adjustment 914 may increase the brightness of each pixel equally so as to generate a final processed image 916 that is at an attractive level of brightness for presentation to viewers, but that does not affect the reduced dynamic range (i.e., the more uniform brightness) achieved by computation 906-2. For example, system 400 (e.g., data generation facility 406) may perform universal brightness adjustment 914 on each pixel of the processed image subsequent to generating the processed image (i.e., subsequent to performing computation 906-2) and prior to providing processed image 916 for presentation on a display screen, as shown. Universal brightness adjustment may be performed by multiplying a brightness value of each pixel in the processed image by a universal lighting coefficient (e.g., $B_U$ in Equation 3).

The amount by which each pixel is universally brightened (i.e., the magnitude of $B_U$ in Equation 3) may be determined in any manner as may serve a particular implementation. For instance, the brightening factor may be determined using an autoexposure algorithm such as a conventional autoexposure algorithm used to generate image 602 in FIG. 6. In other examples, another slider input tool similar to the one described above; or another suitable user input mechanism, may be provided in a user interface to allow users to manually select a desired brightness level.

Additionally, in some examples, universal brightness adjustment 914 may be proceeded or succeeded by one or more other adjustment stages (not explicitly shown in FIG. 9) that are configured to adjust the brightness of each pixel in a localized, non-universal manner as part of generating a processed image 916. As one example, once the brightness of each pixel has been adjusted to simulate, for instance, an autoexposed image illuminated with far-range lighting from a virtual position removed from the operational scene (e.g., the position of virtual light source 512), system 400 may further adjust the brightness of certain pixels in order to simulate shadowing effects as illuminated by the far-range lighting at the virtual position. System 400 may adjust brightness in localized areas of the image to simulate such shadowing effects in any suitable way. For example, system 400 may adjust the brightness values by using simulated ray-casting techniques to calculate where shadows should, and should not, be present in the operational scene based on the simulated position of the virtual light source. Adding and/or adjusting such shadows may provide an additional element of realism for processed image 916, making the operational scene in the processed image more genuinely appear to be illuminated by the far-range lighting at the virtual position outside the operational area.

While a single image (e.g., image 702) captured at a single point in time has been described in many of the examples up to this point, it will be understood that image 702 depicting the operational scene may be included within a sequence of images depicting the operational scene. Specifically, for example, an image sequence (e.g., a video stream) composed of a large number of sequential images may be captured by the image sensor of imaging device 502 and, as such, there may be various prior images captured within the image sequence before image 702. In some examples, similar processing that has been performed for such prior images may facilitate (e.g., provide processing "shortcuts") for the processing of image 702 and/or depth map 802 as shown in dataflow 900. For example, system 400 may be configured to access one or more prior images and/or depth maps that have already been processed before accessing image 702 and/or depth map 802, and may perform certain operations (e.g., the accessing of depth map 802, the determination of far-range lighting coefficients 908 for each pixel in the image, etc.) based on the accessed prior image and/or depth map. For example, far-range lighting coefficients 908 may not tend to change significantly from frame to frame in an image sequence, so system 400 may not update all of the far-range lighting coefficients for each frame, but, rather, may access (e.g., from storage facility 408) the far-range lighting coefficients calculated for a previous image and only update the far-range lighting coefficients periodically (e.g., every other frame, every ten frames, every second, every minute, etc.).

As shown in FIG. 9, at the end of dataflow 900, processed image 916 is generated that may be provided for display on any of the display screens described herein. To illustrate, FIG. 10 shows exemplary brightness values of certain pixels of processed image 916. As shown in FIG. 10, processed image 916 is similar to images 602 and 702 and uses the same key (i.e., key 604) to notate brightness values of different pixels in the pixel groups. Like images 602 and 702, pixel group 610 in processed image 916 includes the saturated pixels and pixel group 612 includes the dark pixels that are not altered by the processing of system 400 for the reasons described above. However, as illustrated by pixel groups 606 and 608, other (non-extreme) pixels in image 916 have been altered to become more uniform, such that processed image 916 has a lower dynamic range that will make the image more attractive to present on the display screen, easier to view and analyze in detail by viewers, and so forth. Specifically, as shown, pixels in pixel group 606 have been brightened as compared to the raw values shown in this pixel group in image 702, while pixels in pixel group 608 have been dimmed as compared to the raw values shown in this pixel group in image 702. Accordingly, rather than a dynamic range from "D" to "Z," as shown in image 702, the dynamic range of brightness has been reduced in processed image 916 to a dynamic range from "F" to "5".

Figure 11:
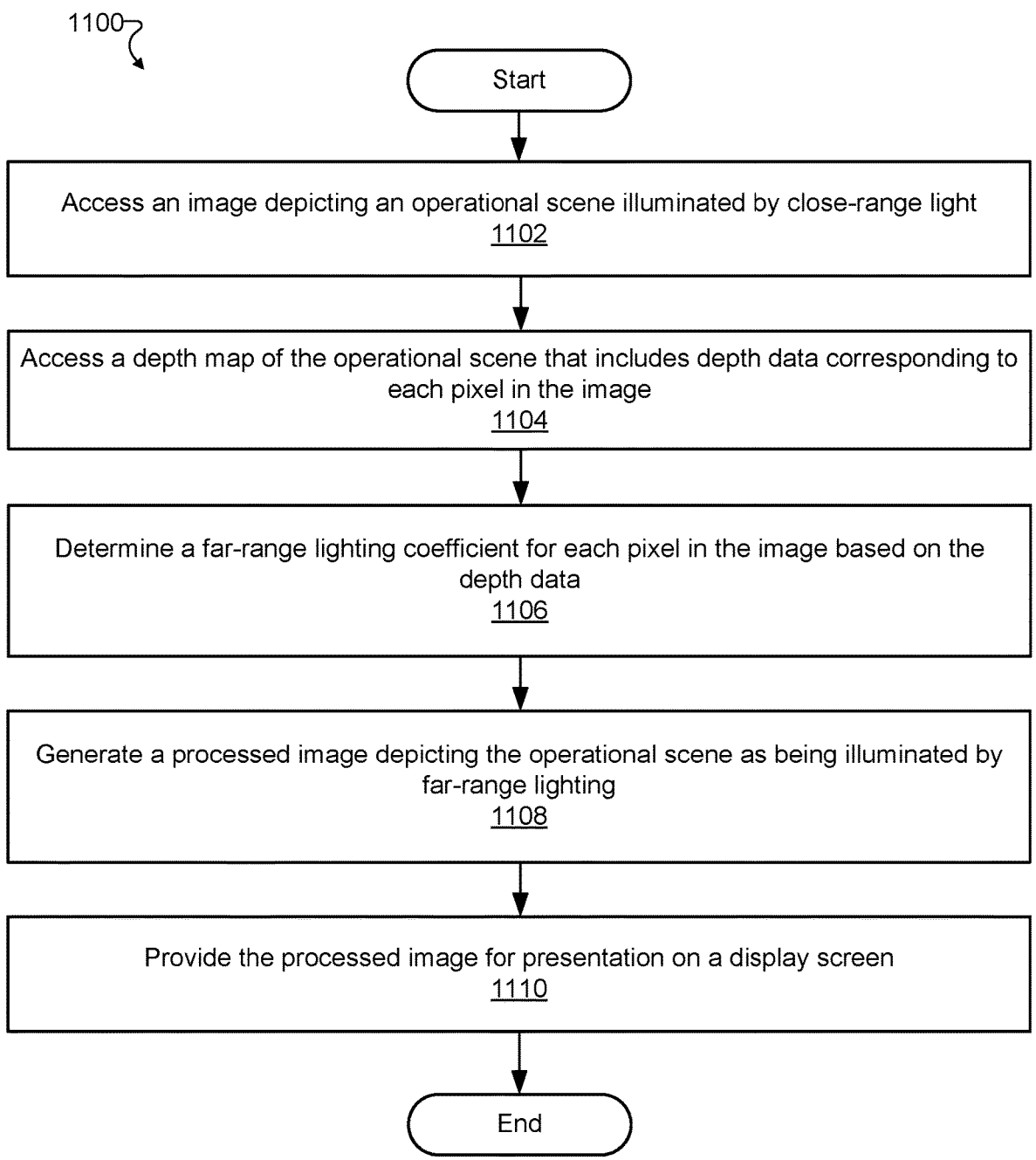
FIG. 11 illustrates an exemplary method for emulating far-range lighting for an operational scene illuminated by close-range light according to principles described herein.

FIG. 11 illustrates an exemplary method 1100 for emulating far-range lighting for an operational scene illuminated by close-range light. While FIG. 11 illustrates exemplary operations according to one embodiment, other embodiments may omit, add to, reorder, and/or modify any of the operations shown in FIG. 11. One or more of the operations shown in FIG. 11 may be performed by a lighting emulation system such as system 400, any components included therein, and/or any implementation thereof.

In operation 1102, a lighting emulation system may access an image depicting an operational scene illuminated by close-range light. For example, the image may be captured by an image sensor included within an imaging device located at an operational area that includes the operational scene. Operation 1102 may be performed in any of the ways described herein.

In operation 1104, the lighting emulation system may access a depth map of the operational scene. The depth map accessed in operation 1104 may include depth data corresponding to each pixel in the image accessed in operation 1102. Operation 1104 may be performed in any of the ways described herein.

In operation 1106, the lighting emulation system may determine a far-range lighting coefficient for each pixel in the image accessed in operation 1102. For example, the lighting emulation system may determine the far-range lighting coefficient based on the depth map accessed in operation 1104. In some examples, the determining of the far-range lighting coefficient for each respective pixel in operation 1106 may be performed based on the corresponding depth data included in the depth map for that respective pixel. Operation 1106 may be performed in any of the ways described herein.

In operation 1108, the lighting emulation system may generate a processed image depicting the operational scene as being illuminated by far-range lighting. For example, the lighting emulation system may generate the processed image based on the image accessed in operation 1102 and further based on the far-range lighting coefficient for each pixel in the image determined in operation 1106. Operation 1108 may be performed in any of the ways described herein.

In operation 1110, the lighting emulation system may provide the processed image for presentation on a display screen. Operation 1110 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor, etc.) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 12:
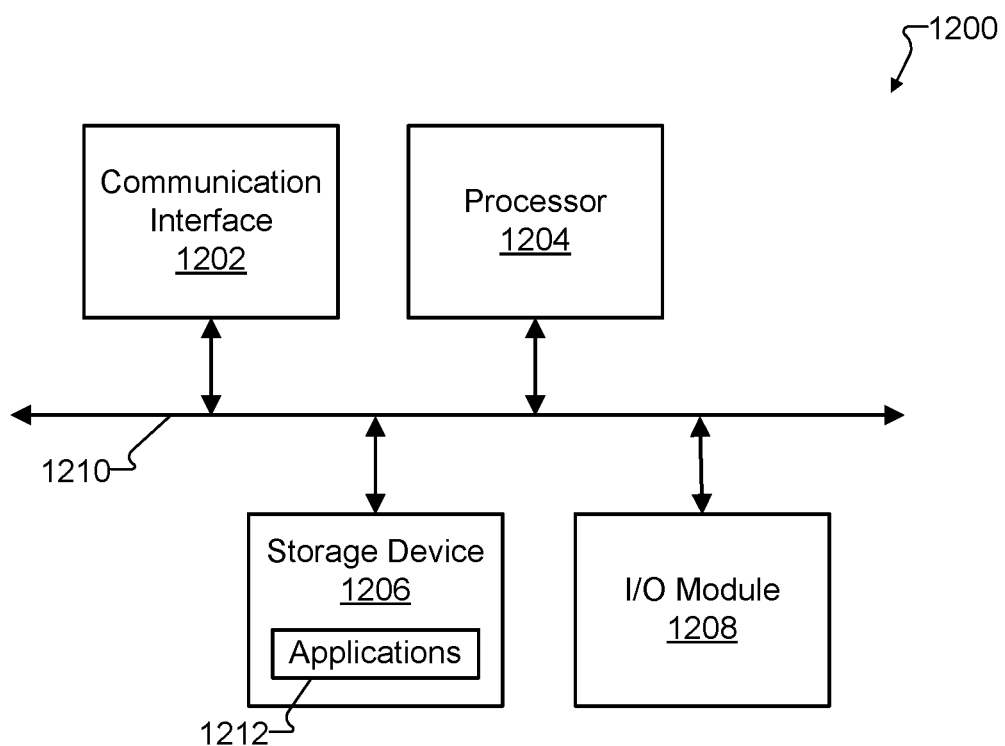
FIG. 12 illustrates an exemplary computing device according to principles described herein.

FIG. 12 illustrates an exemplary computing device 1200 that may be specifically configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. One or more I/O modules may be used to receive input for a single virtual reality experience. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated facilities 402 through 406 of system 400. Likewise, storage facility 408 of system 400 may be implemented by storage device 1206 or a component thereof.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
a processor; and
a memory communicatively coupled with the processor and storing instructions executable by the processor to:
direct an imaging device to capture an image using a particular exposure algorithm, wherein the image depicts an operational scene illuminated by close-range light, and the particular exposure algorithm is configured to minimize pixels that, when captured by an image sensor of the imaging device, are so bright that the image sensor saturates or are so dim that the image sensor detects no appreciable amount of light,
access a depth map of the operational scene, the depth map including depth data corresponding to each pixel in the image,
determine, based on the depth map, a far-range lighting coefficient for each pixel in the image, the far-range lighting coefficient for each respective pixel determined based on the corresponding depth data included in the depth map for that respective pixel,
generate, based on the image and the far-range lighting coefficient for each pixel in the image, a processed image depicting the operational scene as being illuminated by far-range lighting, and
provide the processed image for presentation on a display screen.

2. The system of claim 1, wherein:
the close-range light illuminating the operational scene originates from a physical light source associated with the imaging device and located at a first position a first distance from a particular point in the operational scene;
the far-range lighting illuminating the operational scene as depicted in the processed image virtually originates from a virtual light source simulated to be located at a second position a second distance from the particular point in the operational scene, the second distance greater than the first distance; and
the instructions are executable by the processor to determine, based on a ratio of the second distance to the first distance, the far-range lighting coefficient for a particular pixel in the image that represents the particular point in the operational scene.

3. The system of claim 2, wherein the instructions are further executable by the processor to:
receive, from a user of the system, user input representative of a user selection of the second position at which the virtual light source is simulated to be located; and
define the second position based on the user input.

4. The system of claim 3, wherein:
the instructions are further executable by the processor to provide, a slider input tool configured to facilitate the user selection of the second position; and
the instructions are executable by the processor to define the second position at which the virtual light source is simulated to be located based on a setting of the slider input tool selected by the user.

5. The system of claim 1, wherein:
the image captured by the imaging device is associated with a first dynamic range;
the instructions are executable by the processor to generate the processed image depicting the operational scene as being illuminated by the far-range lighting by multiplying a brightness value of each respective pixel in the image depicting the operational scene by the far-range lighting coefficient determined for that respective pixel; and
the processed image depicting the operational scene is associated with a second dynamic range that is less than the first dynamic range.

6. The system of claim 1, wherein:
the instructions are further executable by the processor to perform a universal brightness adjustment on each pixel of the processed image subsequent to generating the processed image and prior to providing the processed image for presentation on the display screen; and
the instructions are executable by the processor to perform the universal brightness adjustment by multiplying a brightness value of each pixel in the processed image by a universal lighting coefficient.

7. The system of claim 1, wherein the instructions are executable by the processor to access the depth map of the operational scene by:
accessing a first image and a second image from the imaging device, the first and second images depicting the operational scene from stereoscopic vantage points having a predetermined spatial relationship;
comparing the first image to the second image; and
generating the depth map based on the comparison of the first image to the second image.

8. The system of claim 7, wherein:
the imaging device is a stereoscopic imaging device that includes a first image sensor and a second image sensor that is stereoscopic with the first image sensor such that the first and second image sensors are together configured to capture sets of synchronized stereoscopic images; and
the first and second images are included within a particular set of synchronized stereoscopic images captured by the first and second image sensors included within the stereoscopic imaging device.

9. The system of claim 7, wherein:
the first image is captured at a first time by the imaging device; and
the second image is captured at a second time by the imaging device, the second time distinct from the first time.

10. The system of claim 1, wherein:
the image depicting the operational scene is included within a sequence of images depicting the operational scene, the sequence of images captured by the imaging device and further including a prior image that is captured within the sequence before the image;
the instructions are executable by the processor to access the prior image before accessing the image; and
the instructions are executable by the processor to perform, based on the accessed prior image, at least one of the accessing of the depth map and the determination of the far-range lighting coefficient for each pixel in the image.

11. A system comprising:
an imaging device configured to capture an image depicting an operational scene as illuminated by close-range light;
a physical light source associated with the imaging device and configured to generate the close-range light to illuminate the operational scene;
a display screen configured to present images captured by the imaging device;
a processor communicatively coupled to the imaging device; and
a memory communicatively coupled to the processor and storing instructions executable by the processor to:
direct the imaging device to capture, using a particular exposure algorithm, the image depicting the operational scene as illuminated by the close-range light, wherein the particular exposure algorithm is configured to minimize pixels that, when captured by an image sensor of the imaging device, are so bright that the image sensor saturates or are so dim that the image sensor detects no appreciable amount of light,
generate, based on the image depicting the operational scene, a depth map of the operational scene, the depth map including depth data corresponding to each pixel in the image,
determine, based on the depth map, a far-range lighting coefficient for each pixel in the image, the far-range lighting coefficient for each respective pixel determined based on the corresponding depth data included in the depth map for that respective pixel,
generate, based on the image and the far-range lighting coefficient for each pixel in the image, a processed image depicting the operational scene as being illuminated by far-range lighting, and
provide the processed image for presentation on the display screen.

12. The system of claim 11, wherein:
the physical light source is located at a first position a first distance from a particular point in the operational scene;
the far-range lighting illuminating the operational scene as depicted in the processed image virtually originates from a virtual light source simulated to be located at a second position a second distance from the particular point in the operational scene, the second distance greater than the first distance; and
the instructions are executable by the processor to determine, based on a ratio of the second distance to the first distance, the far-range lighting coefficient for a particular pixel in the image that represents the particular point in the operational scene.

13. The system of claim 11, wherein:
the image depicting the operational scene is associated with a first dynamic range;
the instructions are executable by the processor to generate the processed image depicting the operational scene as being illuminated by the far-range lighting by multiplying a brightness value of each respective pixel in the image depicting the operational scene by the far-range lighting coefficient determined for that respective pixel; and
the processed image depicting the operational scene is associated with a second dynamic range that is less than the first dynamic range.

14. The system of claim 11, wherein:
the instructions are further executable by the processor to perform a universal brightness adjustment on each pixel of the processed image subsequent to generating the processed image and prior to providing the processed image for presentation on the display screen; and
the instructions are executable by the processor to perform the universal brightness adjustment by multiplying a brightness value of each pixel in the processed image by a universal lighting coefficient.

15. The system of claim 11, wherein:
the imaging device is a stereoscopic imaging device that includes a first image sensor and a second image sensor that is stereoscopic with the first image sensor such that the first and second image sensors are together configured to capture sets of synchronized stereoscopic images; and
the instructions are executable by the processor to generate the depth map of the operational scene by:
directing the stereoscopic imaging device to capture, by way of the first and second image sensors, a first image and a second image included within a particular set of synchronized stereoscopic images, the first and second images depicting the operational scene from stereoscopic vantage points having a predetermined spatial relationship;
comparing the first image to the second image; and
generating the depth map based on the comparison of the first image to the second image.

16. The system of claim 11, wherein:
the image depicting the operational scene is included within a sequence of images depicting the operational scene, the sequence of images captured by the imaging device and further including a prior image that is captured within the sequence before the image;
the instructions are executable by the processor to access the prior image before capturing the image by way of the imaging device; and
the instructions are executable by the processor to perform, based on the accessed prior image, at least one of the generation of the depth map and the determination of the far-range lighting coefficient for each pixel in the image.

17. A method comprising:
directing, by a lighting emulation system, an imaging device to capture an image using a particular exposure algorithm, wherein the image depicts an operational scene illuminated by close-range light, and the particular exposure algorithm is configured to minimize pixels that, when captured by an image sensor of the imaging device, are so bright that the image sensor saturates or are so dim that the image sensor detects no appreciable amount of light;
accessing, by the lighting emulation system, a depth map of the operational scene, the depth map including depth data corresponding to each pixel in the image;
determining, by the lighting emulation system based on the depth map, a far-range lighting coefficient for each pixel in the image, the determining of the far-range lighting coefficient for each respective pixel performed based on the corresponding depth data included in the depth map for that respective pixel;
generating, by the lighting emulation system based on the image and the far-range lighting coefficient for each pixel in the image, a processed image depicting the operational scene as being illuminated by far-range lighting; and
providing, by the lighting emulation system, the processed image for presentation on a display screen.

18. The method of claim 17, wherein:
the close-range light illuminating the operational scene originates from a physical light source associated with the imaging device and located at a first position a first distance from a particular point in the operational scene;
the far-range lighting illuminating the operational scene as depicted in the processed image virtually originates from a virtual light source simulated to be located at a second position a second distance from the particular point in the operational scene, the second distance greater than the first distance; and
the determining of the far-range lighting coefficient for a particular pixel in the image that represents the particular point in the operational scene is based on a ratio of the second distance to the first distance.

19. The method of claim 17, further comprising performing, by the lighting emulation system, a universal brightness adjustment on each pixel of the processed image subsequent to generating the processed image and prior to providing the processed image for presentation on the display screen;
wherein the performing of the universal brightness adjustment includes multiplying a brightness value of each pixel in the processed image by a universal lighting coefficient.

20. The method of claim 17, wherein the accessing of the depth map of the operational scene includes:
accessing a first image and a second image from the imaging device, the first and second images depicting the operational scene from stereoscopic vantage points having a predetermined spatial relationship;
comparing the first image to the second image; and
generating the depth map based on the comparison of the first image to the second image.

* * * * *